US007872675B2

(12) United States Patent
Levien et al.

(10) Patent No.: US 7,872,675 B2
(45) Date of Patent: Jan. 18, 2011

(54) SAVED-IMAGE MANAGEMENT

(75) Inventors: Royce A. Levien, Lexington, MA (US);
Robert W. Lord, Seattle, WA (US);
Mark A. Malamud, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 997 days.

(21) Appl. No.: 11/263,587

(22) Filed: Oct. 31, 2005

(65) Prior Publication Data
US 2006/0274163 A1 Dec. 7, 2006

Related U.S. Application Data

(63) Continuation-in-part of application No. 11/143,970, filed on Jun. 2, 2005, and a continuation-in-part of application No. 11/190,516, filed on Jul. 26, 2005.

(51) Int. Cl.
*H04N 5/76* (2006.01)
*H04N 5/222* (2006.01)
*H04N 7/18* (2006.01)

(52) U.S. Cl. .............. 348/231.1; 348/231.2; 348/231.3; 348/333.11; 348/143

(58) Field of Classification Search ................ 348/211, 348/211.2, 211.3, 231.2, 143–160, 47, 211.11, 348/211.1, 231.1, 14.12, 208.13, 333.11, 348/231.3, 208.12, 333.12; 725/105
See application file for complete search history.

(56) References Cited

U.S. PATENT DOCUMENTS

| | | | |
|---|---|---|---|
| 4,249,218 A | 2/1981 | Davis et al. | |
| 5,164,831 A | 11/1992 | Kuchta et al. | |
| 5,388,197 A | 2/1995 | Rayner | |
| 5,467,288 A | 11/1995 | Fasciano et al. | |
| 5,546,145 A | 8/1996 | Bernardi et al. | |
| 5,561,883 A | 10/1996 | Landry et al. | |
| 5,629,778 A | 5/1997 | Reuman | |
| 5,633,678 A | 5/1997 | Parulski et al. | |
| 5,659,662 A | 8/1997 | Wilcox et al. | |

(Continued)

FOREIGN PATENT DOCUMENTS

JP H09-018762 1/1997

(Continued)

OTHER PUBLICATIONS

Reichmann, Michael; "Understanding Raw Files"; Luminous-landscape.com; Printed on Oct. 25, 2005; pp. 1-9; located at: http://www.luminous-landscape.com/tutorials/understanding-series/u-raw-files.shtml.

(Continued)

*Primary Examiner*—Lin Ye
*Assistant Examiner*—Marly Camargo
(74) *Attorney, Agent, or Firm*—Lee & Hayes, PLLC

(57) ABSTRACT

Embodiments include an apparatus, device, system, computer-program product, and method. In an embodiment, a device includes a user-accessible digital storage medium, and a storage medium manager module. The storage manager module includes a storage manager module operable to save a digital image in a form in the user-accessible digital storage medium, and then alter the form of the saved digital image if a condition is met.

22 Claims, 30 Drawing Sheets

U.S. PATENT DOCUMENTS

| | | | |
|---|---|---|---|
| 5,675,789 A | 10/1997 | Ishii et al. | |
| 5,689,442 A | 11/1997 | Swanson et al. | |
| 5,701,163 A | 12/1997 | Richards et al. | |
| 5,738,522 A * | 4/1998 | Sussholtz et al. | 434/22 |
| 5,764,800 A | 6/1998 | Yamagata | |
| 5,825,506 A | 10/1998 | Bednar et al. | |
| 5,892,509 A | 4/1999 | Jakobs et al. | |
| 5,917,958 A | 6/1999 | Nunally et al. | |
| 5,926,605 A | 7/1999 | Ichimura | |
| 5,956,081 A | 9/1999 | Katz et al. | |
| 5,959,622 A | 9/1999 | Greer et al. | |
| 5,995,095 A | 11/1999 | Ratakonda | |
| 6,034,786 A | 3/2000 | Kwon | |
| 6,107,918 A | 8/2000 | Klein et al. | |
| 6,122,003 A | 9/2000 | Anderson | |
| 6,122,411 A * | 9/2000 | Shen et al. | 382/299 |
| 6,134,345 A | 10/2000 | Berman et al. | |
| 6,157,406 A | 12/2000 | Iura et al. | |
| 6,157,935 A | 12/2000 | Tran et al. | |
| 6,167,350 A | 12/2000 | Hiramatsu et al. | |
| 6,198,526 B1 | 3/2001 | Ohtsuka | |
| 6,229,565 B1 | 5/2001 | Bobry | |
| 6,229,850 B1 | 5/2001 | Linzer et al. | |
| 6,275,260 B1 | 8/2001 | Anderson | |
| 6,359,649 B1 | 3/2002 | Suzuki | |
| 6,380,972 B1 | 4/2002 | Suga et al. | |
| 6,384,862 B1 | 5/2002 | Brusewitz et al. | |
| 6,445,822 B1 * | 9/2002 | Crill et al. | 382/218 |
| 6,446,095 B1 | 9/2002 | Mukai | |
| 6,476,858 B1 | 11/2002 | Ramirez Diaz et al. | |
| 6,493,028 B1 | 12/2002 | Anderson et al. | |
| 6,499,016 B1 | 12/2002 | Anderson | |
| 6,512,541 B2 | 1/2003 | Dunton et al. | |
| 6,516,154 B1 | 2/2003 | Parulski et al. | |
| 6,519,612 B1 | 2/2003 | Howard et al. | |
| 6,522,418 B2 | 2/2003 | Yokomizo et al. | |
| 6,539,169 B1 | 3/2003 | Tsubaki et al. | |
| 6,542,183 B1 | 4/2003 | DeAngelis et al. | |
| 6,546,189 B1 | 4/2003 | Koda | |
| 6,567,122 B1 | 5/2003 | Anderson et al. | |
| 6,573,927 B2 | 6/2003 | Parulski et al. | |
| 6,577,336 B2 | 6/2003 | Safai | |
| 6,657,667 B1 | 12/2003 | Anderson | |
| 6,678,413 B1 | 1/2004 | Liang et al. | |
| 6,698,021 B1 | 2/2004 | Amini et al. | |
| 6,701,845 B2 | 3/2004 | Ohmura | |
| 6,710,809 B1 | 3/2004 | Niikawa | |
| 6,714,192 B1 | 3/2004 | Torres | |
| 6,735,253 B1 | 5/2004 | Chang et al. | |
| 6,738,155 B1 | 5/2004 | Rosenlund et al. | |
| 6,750,902 B1 | 6/2004 | Steinberg et al. | |
| 6,757,008 B1 | 6/2004 | Smith | |
| 6,762,791 B1 | 7/2004 | Schuetzle | |
| 6,816,071 B2 | 11/2004 | Conti | |
| 6,823,092 B1 | 11/2004 | Sato | |
| 6,871,010 B1 | 3/2005 | Taguchi et al. | |
| 6,885,395 B1 * | 4/2005 | Rabbani et al. | 348/231.1 |
| 6,947,075 B1 * | 9/2005 | Niikawa | 348/211.14 |
| 6,987,528 B1 | 1/2006 | Nagahisa et al. | |
| 6,999,626 B2 | 2/2006 | Andrew | |
| 7,015,954 B1 | 3/2006 | Foote et al. | |
| 7,046,273 B2 | 5/2006 | Suzuki | |
| 7,046,292 B2 * | 5/2006 | Ziemkowski | 348/371 |
| 7,068,316 B1 | 6/2006 | Pine | |
| 7,075,567 B2 | 7/2006 | Hunter et al. | |
| 7,079,176 B1 | 7/2006 | Freeman et al. | |
| 7,084,910 B2 | 8/2006 | Amerson et al. | |
| 7,110,027 B2 | 9/2006 | Wyman | |
| 7,219,365 B2 | 5/2007 | Sato et al. | |
| 7,221,863 B2 | 5/2007 | Kondo et al. | |
| 7,227,569 B2 | 6/2007 | Maruya | |
| 7,236,690 B2 | 6/2007 | Matsukawa | |
| 7,257,317 B2 | 8/2007 | Ohnishi | |
| 7,333,134 B2 | 2/2008 | Miyamoto | |
| 7,340,766 B2 | 3/2008 | Nagao et al. | |
| 7,362,968 B2 | 4/2008 | Kim | |
| 7,366,979 B2 | 4/2008 | Spielberg et al. | |
| 7,379,116 B2 | 5/2008 | Okamura | |
| 7,411,623 B2 | 8/2008 | Shibutani | |
| 7,417,667 B2 | 8/2008 | Shibutani | |
| 7,448,063 B2 | 11/2008 | Freeman et al. | |
| 7,535,491 B1 * | 5/2009 | Kumagai et al. | 348/211.1 |
| 7,576,770 B2 * | 8/2009 | Metzger et al. | 348/143 |
| 2001/0028398 A1 | 10/2001 | Takahashi | |
| 2001/0029521 A1 | 10/2001 | Matsuda et al. | |
| 2001/0033333 A1 | 10/2001 | Suzuki et al. | |
| 2001/0042043 A1 | 11/2001 | Shear et al. | |
| 2001/0050875 A1 * | 12/2001 | Kahn et al. | 365/229 |
| 2002/0028026 A1 | 3/2002 | Chen et al. | |
| 2002/0030749 A1 | 3/2002 | Nakamura et al. | |
| 2002/0054232 A1 | 5/2002 | Inagaki | |
| 2002/0145622 A1 | 10/2002 | Kauffman et al. | |
| 2002/0149677 A1 | 10/2002 | Wright | |
| 2002/0171737 A1 | 11/2002 | Tullis | |
| 2002/0171747 A1 | 11/2002 | Niikawa et al. | |
| 2002/0176016 A1 | 11/2002 | Misawa et al. | |
| 2002/0191952 A1 | 12/2002 | Fiore et al. | |
| 2002/0196344 A1 | 12/2002 | McIntyre et al. | |
| 2002/0197067 A1 | 12/2002 | Ohnishi | |
| 2003/0007078 A1 | 1/2003 | Feldis, III | |
| 2003/0018802 A1 | 1/2003 | Romanik et al. | |
| 2003/0020814 A1 | 1/2003 | Ono | |
| 2003/0021455 A1 | 1/2003 | Dixon et al. | |
| 2003/0026596 A1 | 2/2003 | Betti et al. | |
| 2003/0063211 A1 | 4/2003 | Watanabe et al. | |
| 2003/0069898 A1 | 4/2003 | Christodoulou et al. | |
| 2003/0072491 A1 | 4/2003 | Sirivara et al. | |
| 2003/0080878 A1 | 5/2003 | Kirmuss | |
| 2003/0081140 A1 | 5/2003 | Furukawa | |
| 2003/0090690 A1 | 5/2003 | Katayama et al. | |
| 2003/0095191 A1 | 5/2003 | Saito | |
| 2003/0103144 A1 | 6/2003 | Sesek et al. | |
| 2003/0112354 A1 | 6/2003 | Ortiz et al. | |
| 2003/0113014 A1 | 6/2003 | Katoh | |
| 2003/0117642 A1 | 6/2003 | Haraguchi | |
| 2003/0131002 A1 | 7/2003 | Gennetten et al. | |
| 2003/0151679 A1 | 8/2003 | Amerson et al. | |
| 2003/0152263 A1 | 8/2003 | Kawano et al. | |
| 2003/0160870 A1 | 8/2003 | Ziemkowski | |
| 2003/0206232 A1 | 11/2003 | Suzuki et al. | |
| 2003/0222998 A1 | 12/2003 | Yamauchi et al. | |
| 2004/0017333 A1 | 1/2004 | Cooper et al. | |
| 2004/0042679 A1 | 3/2004 | Yamada | |
| 2004/0066968 A1 | 4/2004 | Glickman | |
| 2004/0070678 A1 | 4/2004 | Toyama et al. | |
| 2004/0075750 A1 * | 4/2004 | Bateman | 348/231.1 |
| 2004/0085456 A1 | 5/2004 | Kwag et al. | |
| 2004/0095474 A1 | 5/2004 | Matsufune | |
| 2004/0120562 A1 | 6/2004 | Hays et al. | |
| 2004/0123131 A1 | 6/2004 | Zacks et al. | |
| 2004/0130634 A1 | 7/2004 | Delaney et al. | |
| 2004/0131282 A1 * | 7/2004 | Yoshida et al. | 382/312 |
| 2004/0174454 A1 | 9/2004 | Okamura | |
| 2004/0179121 A1 | 9/2004 | Silverstein | |
| 2004/0183903 A1 | 9/2004 | Pedersen | |
| 2004/0201690 A1 | 10/2004 | Bryant et al. | |
| 2004/0201709 A1 | 10/2004 | McIntyre et al. | |
| 2004/0216173 A1 | 10/2004 | Horoszowski et al. | |
| 2004/0218894 A1 | 11/2004 | Harville et al. | |
| 2004/0239958 A1 | 12/2004 | Nagata et al. | |
| 2004/0252193 A1 | 12/2004 | Higgins | |
| 2004/0257462 A1 | 12/2004 | Goris et al. | |
| 2004/0263658 A1 | 12/2004 | Cozier et al. | |
| 2005/0013602 A1 | 1/2005 | Ogawa | |

| | | | |
|---|---|---|---|
| 2005/0018053 | A1 | 1/2005 | Suga et al. |
| 2005/0028221 | A1 | 2/2005 | Liu et al. |
| 2005/0036033 | A1 | 2/2005 | Imai |
| 2005/0046707 | A1 | 3/2005 | Takane |
| 2005/0057687 | A1 | 3/2005 | Irani et al. |
| 2005/0093980 | A1 | 5/2005 | Nonaka et al. |
| 2005/0103863 | A1 | 5/2005 | Zhu et al. |
| 2005/0131905 | A1 | 6/2005 | Margolus et al. |
| 2005/0158015 | A1 | 7/2005 | Nakayama et al. |
| 2005/0187901 | A1 | 8/2005 | Maritzen et al. |
| 2005/0193421 | A1 | 9/2005 | Cragun |
| 2005/0203930 | A1 | 9/2005 | Bukowski et al. |
| 2005/0212912 | A1 | 9/2005 | Huster |
| 2005/0212950 | A1 | 9/2005 | Kanai |
| 2005/0231625 | A1 | 10/2005 | Parulski et al. |
| 2005/0262097 | A1 | 11/2005 | Sim-Tang et al. |
| 2005/0271251 | A1 | 12/2005 | Russell et al. |
| 2006/0023066 | A1 | 2/2006 | Li et al. |
| 2006/0044398 | A1 | 3/2006 | Foong et al. |
| 2006/0044416 | A1 | 3/2006 | Miyazaki et al. |
| 2006/0087559 | A1 | 4/2006 | Huberman et al. |
| 2006/0092291 | A1 | 5/2006 | Bodie |
| 2006/0098112 | A1 | 5/2006 | Kelly |
| 2006/0109349 | A1 | 5/2006 | Takashima |
| 2006/0125922 | A1 | 6/2006 | Albert et al. |
| 2006/0143665 | A1 | 6/2006 | Meek et al. |
| 2006/0203099 | A1 | 9/2006 | Omata |
| 2006/0268117 | A1* | 11/2006 | Loui et al. ............... 348/220.1 |
| 2008/0023232 | A1 | 1/2008 | Morag et al. |

FOREIGN PATENT DOCUMENTS

| | | | |
|---|---|---|---|
| JP | 10023303 A | | 1/1998 |
| JP | 2001-309236 A | | 11/2001 |
| JP | 2002-094862 A | | 3/2002 |
| JP | 2003-009044 A | | 1/2003 |
| WO | WO 2005/078597 A1 | | 8/2005 |

OTHER PUBLICATIONS

"What is storage device?—A Word Definition From the Webopedia Computer Dictionary"; Webopedia.com; Bearing dates of Oct. 30, 2001 and 2005, printed on Oct. 25, 2005; pp. 1-4; located at: http://www.webopedia.com/TERM/S/storage_device.htm.

U.S. Appl. No. 12/290,538, Jung et al.
U.S. Appl. No. 12/284,202, Jung et al.
U.S. Appl. No. 12/283,420, Jung et al.
PCT International Search Report; International App. No. PCT/US06/42699; dated Sep. 18, 2008; pp. 1-5.
PCT International Search Report; International App. No. PCT/US06/42841; dated Sep. 15, 2008; pp. 1-2.
PCT International Search Report; International App. No. PCT/US07/04934; dated Sep. 12, 2008; pp. 1-2.
U.S. Appl. No. 11/703,063, Jung et al.
U.S. Appl. No. 11/702,034, Jung et al.
U.S. Appl. No. 11/655,734, Jung et al.
U.S. Appl. No. 11/640,836, Levien et al.
U.S. Appl. No. 11/594,695, Levien et al.
U.S. Appl. No. 11/591,435, Jung et al.
U.S. Appl. No. 11/541,382, Jung et al.
U.S. Appl. No. 11/526,886, Jung et al.
U.S. Appl. No. 11/510,139, Jung et al.
U.S. Appl. No. 11/508,554, Jung et al.
U.S. Appl. No. 11/506,760, Jung et al.
U.S. Appl. No. 11/475,516, Levien et al.
U.S. Appl. No. 11/455,001, Jung et al.
U.S. Appl. No. 11/441,785, Jung et al.
U.S. Appl. No. 11/440,409, Levien et al.
U.S. Appl. No. 11/437,284, Levien et al.
U.S. Appl. No. 11/434,568, Jung et al.
U.S. Appl. No. 11/413,271, Jung et al.
U.S. Appl. No. 11/404,381, Levien et al.
U.S. Appl. No. 11/404,104, Levien et al.
U.S. Appl. No. 11/397,357, Levien et al.
U.S. Appl. No. 11/376,627, Jung et al.
U.S. Appl. No. 11/264,701, Levien et al.
U.S. Appl. No. 11/213,324, Jung et al.
U.S. Appl. No. 11/210,284, Jung et al.
U.S. Appl. No. 11/173,166, Jung et al.
U.S. Appl. No. 11/153,868, Jung et al.
U.S. Appl. No. 11/129,045, Jung et al.
U.S. Appl. No. 11/122,274, Jung et al.
U.S. Appl. No. 11/115,078, Jung et al.
U.S. Appl. No. 11/095,768, Jung et al.
U.S. Appl. No. 11/089,530, Jung et al.
U.S. Appl. No. 11/069,909, Jung et al.
U.S. Appl. No. 11/064,787, Jung et al.
U.S. Appl. No. 11/048,644, Jung et al.
U.S. Appl. No. 11/048,629, Jung et al.
"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.
"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.
U.S. Appl. No. 12/806,060, Royce A. Levien et al.

* cited by examiner

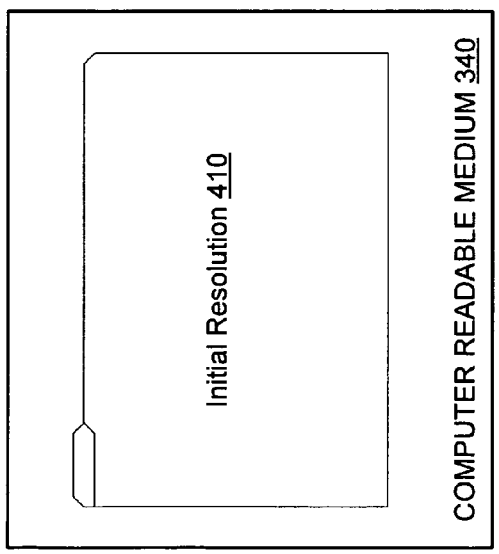
FIG. 4A
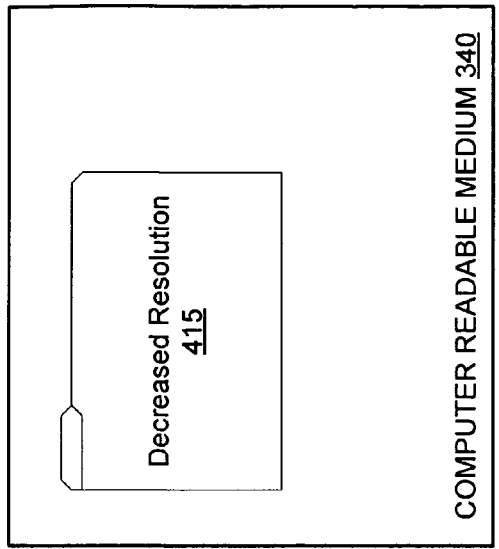
FIG. 4B
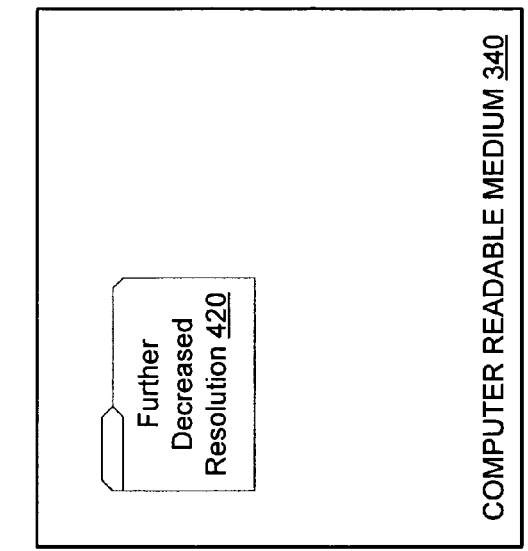
FIG. 4C
FIG. 4

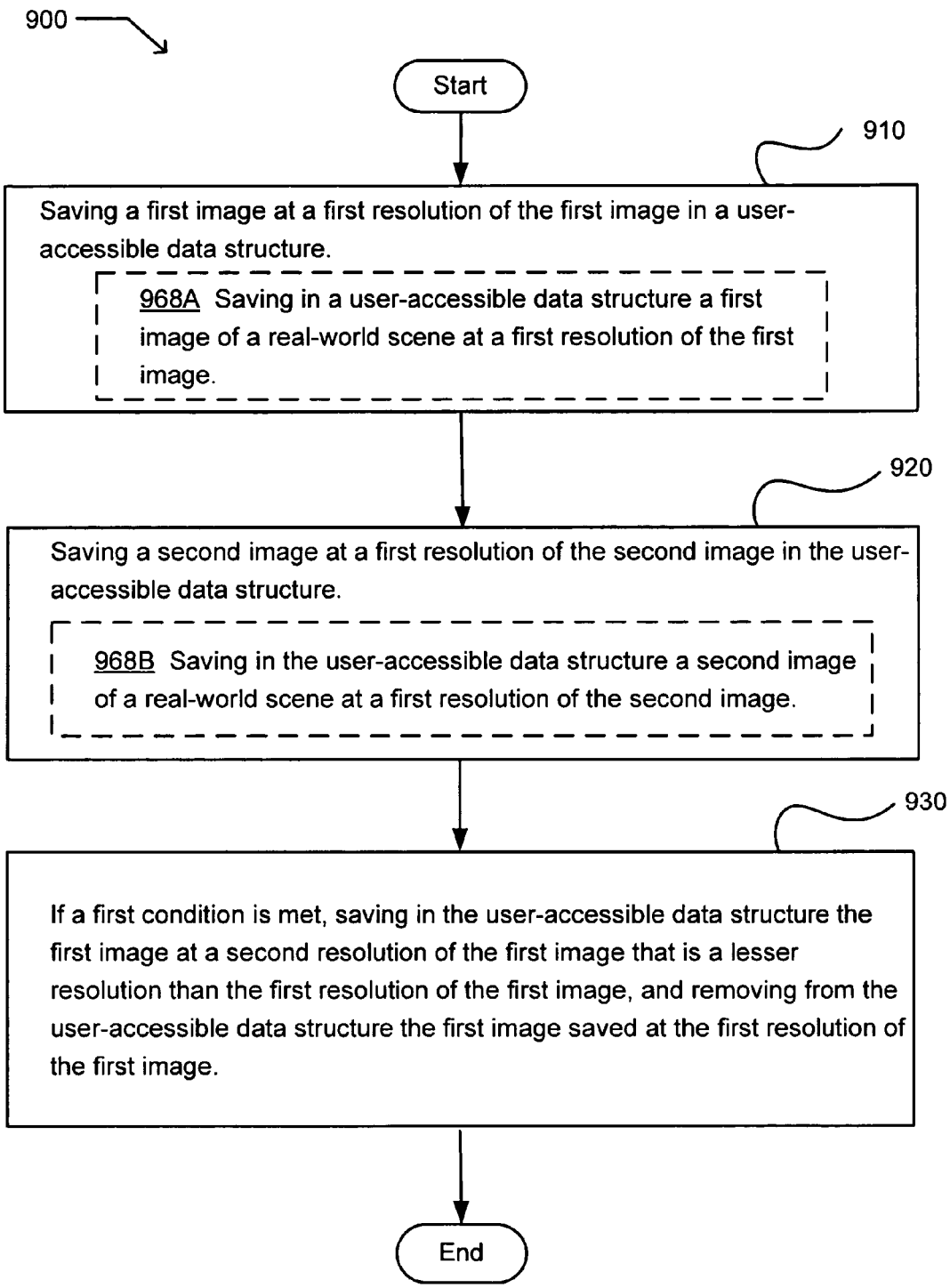

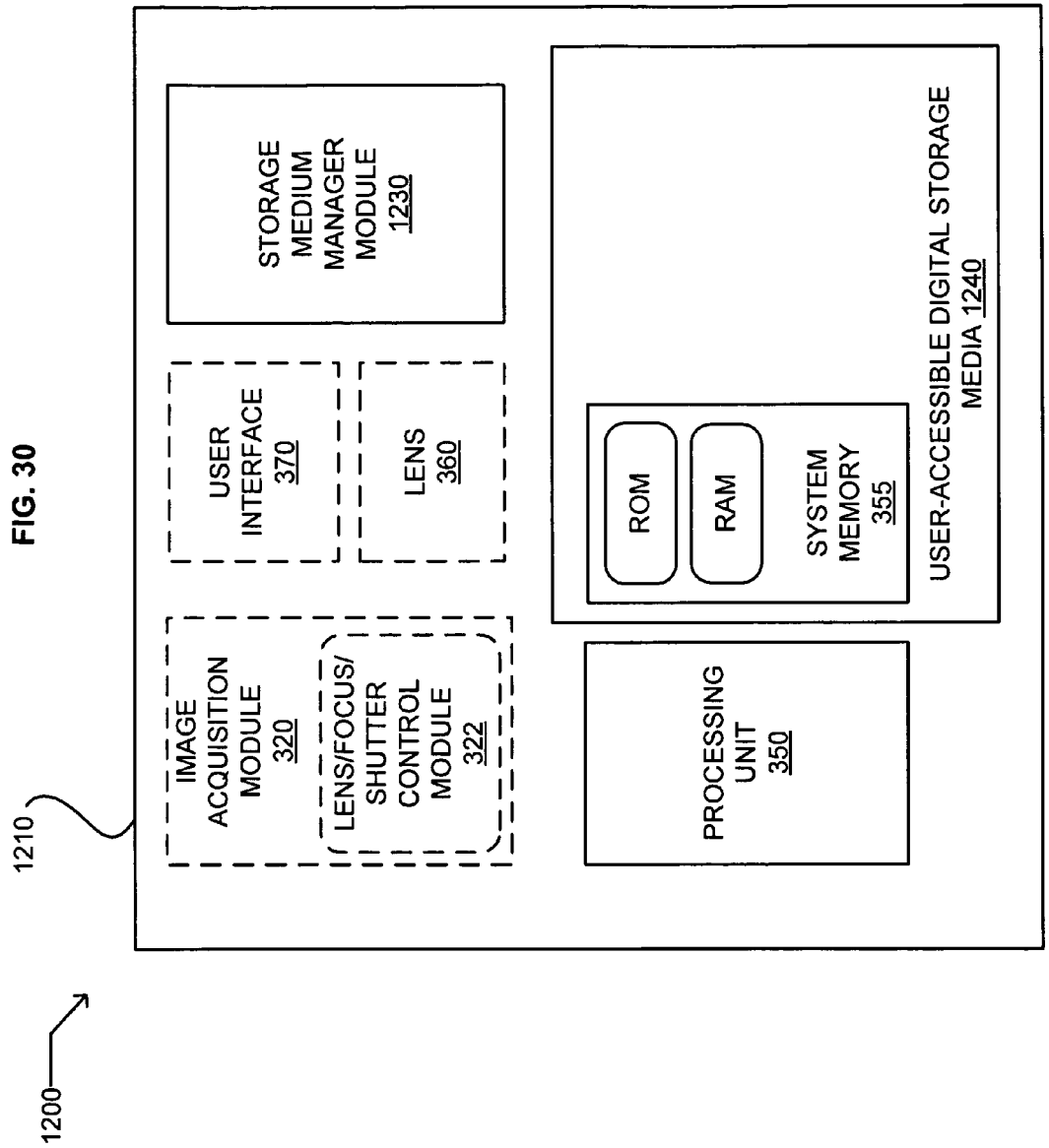

SAVED-IMAGE MANAGEMENT

PRIORITY CLAIM, CROSS-REFERENCE TO RELATED APPLICATION, AND INCORPORATION BY REFERENCE

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation in part of United States patent application entitled ESTIMATING SHARED IMAGE DEVICE OPERATIONAL CAPABILITIES OR RESOURCES, naming Edward K. Y. Jung, Royce A. Levien, Robert W. Lord, Mark A. Malamud, and John D. Rinaldo, Jr. as inventors, filed Jun. 2, 2005, Ser. No. 11/143,970, which is currently co-pending, or is an application of which a currently co-pending application listed as a Related Application is entitled to the benefit of the filing date;

For purposes of the USPTO extra-statutory requirements, the present application constitutes a continuation in part of United States patent application entitled SHARED IMAGE DEVICE DESIGNATION, naming Edward K. Y. Jung, Royce A. Levien, Robert W. Lord, Mark A. Malamud, and John D. Rinaldo, Jr. as inventors, filed Jul. 26, 2005, Ser. No. 11/190,516, which is currently co-pending, or is an application of which a currently co-pending application listed as a Related Application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a digital camera. The digital camera includes an image acquisition module operable to capture an image, a computer readable medium, and an image management module. The image management module includes operability to save a captured image at a resolution in the computer readable medium and in a user-accessible form. The image management module also provides operability to decrease the resolution of the saved captured image in the computer readable medium if a condition is met. The image management module may further include an image management module operable to further decrease the resolution of the captured image saved in the computer readable medium if another condition is met. In addition to the foregoing, other digital camera embodiments are described in the claims, drawings, and text form a part of the present application.

Another embodiment provides a method. The method includes writing a captured image at a resolution in a computer readable medium and in a user-accessible form. The method also includes decreasing the resolution of the written captured image in the computer readable medium if a condition is met. The method may include further decreasing the resolution of the written captured image in the computer readable medium if another condition is met. In addition to the foregoing, other method embodiments are described in the claims, drawings, and text form a part of the present application.

A further embodiment provides device. The device includes an image acquisition module operable to capture an image, a computer readable medium, and an image administration circuit. The image administration circuit includes circuitry for saving a captured image at a first resolution in the computer readable medium. The image administration circuit also includes circuitry for saving the captured image in the computer readable medium at a second resolution that is less than the first resolution and removing the captured image saved at the first resolution from the computer readable medium, if a condition is met. The image administration circuit may include circuitry for saving the captured image in the computer readable medium at a third resolution that is less than the second resolution and removing from the computer readable medium the captured image saved at the second resolution if another condition is met. In addition to the foregoing, other device embodiments are described in the claims, drawings, and text form a part of the present application.

An embodiment provides a method. The method includes saving a photograph in a computer readable medium, the photograph being written in a first digital file having a first file size and an availability to a user. The method also includes, if a condition is met, saving the photograph in a second digital file having a second and smaller file size than the first file size, and removing the first digital file having a first file size from the computer readable medium. In addition to the foregoing, other method embodiments are described in the claims, drawings, and text form a part of the present application.

Another embodiment provides a method. The method includes saving a first image at a first resolution of the first image in a user-accessible data structure. The method also includes saving a second image at a first resolution of the second image in the user-accessible data structure. The method further includes, if a first condition is met, saving in the user-accessible data structure the first image at a second resolution of the first image that is a lesser resolution than the first resolution of the first image, and removing from the user-accessible data structure the first image saved at the first resolution of the first image. In addition to the foregoing, other method embodiments are described in the claims, drawings, and text form a part of the present application.

A further embodiment provides a device. The device includes means for saving a captured image at resolution in a computer readable medium and in a user-accessible form. The device also includes means for decreasing the resolution of the saved captured image in the computer readable medium if a condition is met. In addition to the foregoing, other device embodiments are described in the claims, drawings, and text form a part of the present application.

An embodiment provides a device. The device includes means for saving a photograph in a computer readable medium, the photograph being saved in a first digital file having a first file size and an availability to a human user. The device also includes means for saving the photograph in a second digital file having a second and smaller file size than the first file size and removing the first digital file having a first file size from the computer readable medium, if a condition is met. In addition to the foregoing, other device embodiments are described in the claims, drawings, and text form a part of the present application.

Another embodiment provides a device. The device includes means for saving a first image at a first resolution in a user-accessible data structure. The device also includes means for saving a second image at a first resolution of the second image in the user-accessible data structure. The device further includes means for saving in the user-accessible data structure the first image at a second resolution of the first image that is a lesser resolution than the first resolution of the first image and removing from the user-accessible data structure the first image saved at the first resolution of the first image if a first condition is met. In addition to the foregoing, other device embodiments are described in the claims, drawings, and text form a part of the present application.

A further embodiment provides a method. The method includes saving a digital image in a form in a user-accessible storage medium. The method also includes altering the form of the saved digital image if a condition is met. In addition to the foregoing, other method embodiments are described in the claims, drawings, and text form a part of the present application.

An embodiment provides a device. The device includes a user-accessible digital storage medium, and a storage medium manager module. The storage manager module includes a storage manager module operable to save a digital image in a form in the user-accessible digital storage medium, and then alter the form of the saved digital image if a condition is met. In addition to the foregoing, other device embodiments are described in the claims, drawings, and text form a part of the present application.

Another embodiment provides a computer program product. The computer program product includes program instructions operable to perform a process in a computing device. The process includes saving a digital image in a form in a user-accessible storage medium, and altering the form of the saved digital image if a condition is met. The computer program product also includes a computer-readable signal-bearing medium bearing the program instructions. The process may include providing the altered form of the saved image. In addition to the foregoing, other computer program product embodiments are described in the claims, drawings, and text form a part of the present application.

A further embodiment provides a device. The device includes means for saving a digital image in a form in the digital storage medium. The device also includes means for altering the form of the saved digital image if a condition is met. In addition to the foregoing, other device embodiments are described in the claims, drawings, and text form a part of the present application.

An embodiment provides a method. The method includes saving a captured image in a user-accessible memory. The method also includes deallocating at least a portion of the user-accessible memory associated with the saved captured image if a condition is met. In addition to the foregoing, other method embodiments are described in the claims, drawings, and text form a part of the present application.

Another embodiment provides a device. The device includes a memory, and a memory manager. The memory manager is operable to save a captured image into a user-accessible memory, and deallocate at least a portion of the memory associated with the resolution if a condition is met. In addition to the foregoing, other device embodiments are described in the claims, drawings, and text form a part of the present application.

A further embodiment provides a device. The device includes first means for a holding user-accessible digital data representative of an image. The device also includes second means for saving user-accessible digital data representative of an image in the first means. The device further includes third means for altering the saved user-accessible digital data representative of the saved digital image if a condition is met.

An embodiment provides a computer program product. The computer program product includes program instructions operable to perform a process in a computing device, and a computer-readable signal-bearing medium bearing the program instructions. The process includes saving a captured image in a memory and in a user-accessible form, and deallocating at least a portion of the memory associated with the saved captured image if a condition is met. In addition to the foregoing, other computer program product embodiments are described in the claims, drawings, and text form a part of the present application.

Another embodiment provides a method. The method includes directing digital data representative of an image to a managed means for holding the digital data representative of an image. The method also includes accepting modified digital data representative of the image, the digital data representative of the image having been modified by deallocating at least a portion of the digital data representative of the image by the managed means for holding digital data upon occurrence of a condition. In addition to the foregoing, other method embodiments are described in the claims, drawings, and text form a part of the present application.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent by reference to the drawings and the following detailed description.

BRIEF DESCRIPTION OF THE DRAWINGS

FIGS. 4A-C illustrate an exemplary operation that decreases the resolution of the saved captured image in the computer readable medium;

FIG. 19 illustrates another embodiment of the exemplary operational flow of FIG. 15;

FIG. 30 illustrates an exemplary system in which embodiments may be implemented.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
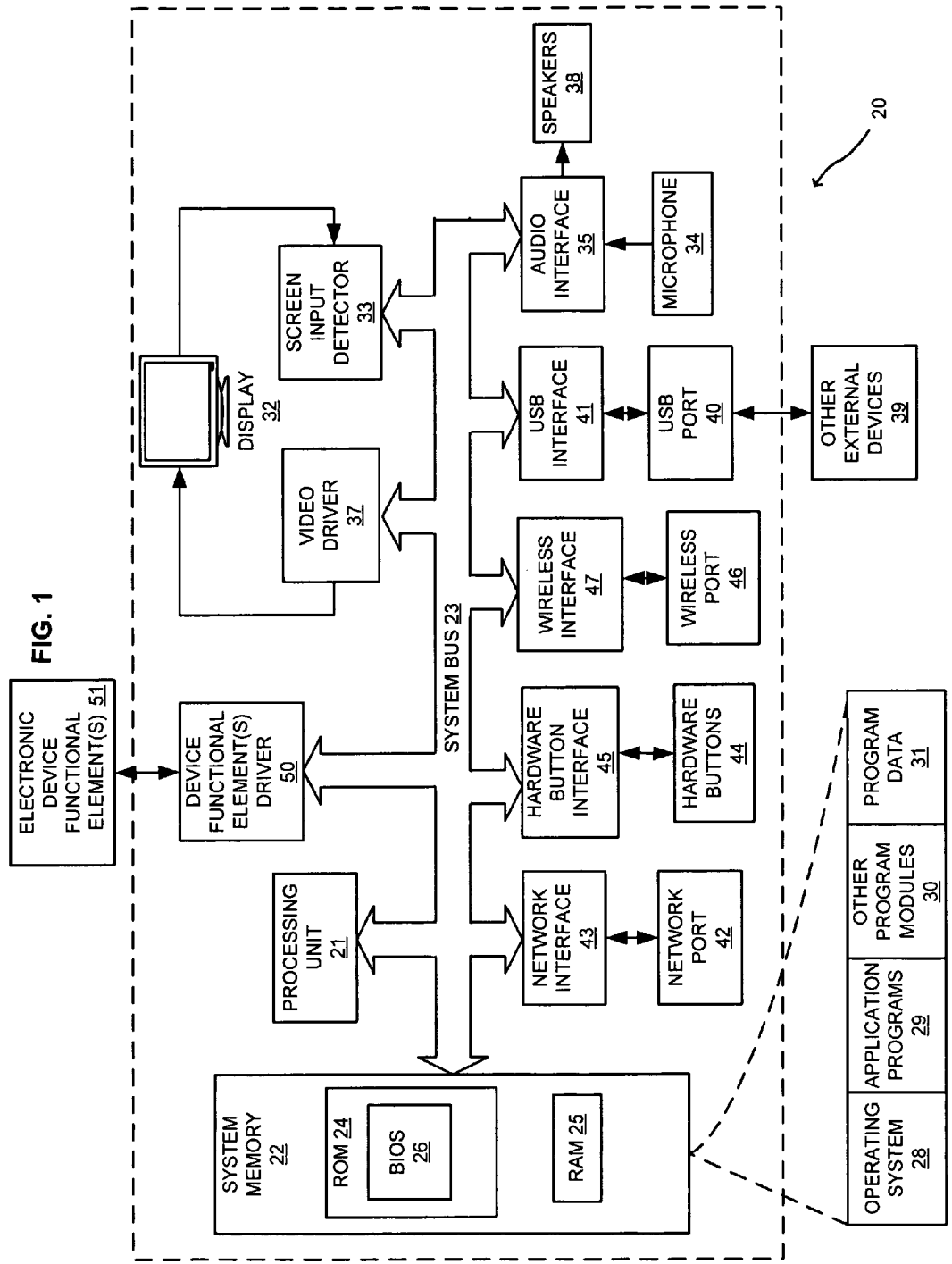
FIG. 1 illustrates the exemplary system that includes a thin computing device 20 that may interface with an electronic device.

FIG. 1 provides a brief, general description of an illustrative and/or suitable exemplary environment in which embodiments may be implemented. In FIG. 1, as in the other figures, the figure is an example of an environment and does not suggest any limitation as to the structure, scope of use, or functionality of an embodiment. An embodiment should not be interpreted as having any dependency or requirement relating to any one or combination of components illustrated in an exemplary environment. For example, in certain instances, elements of an environment and/or a method may be deemed not necessary and omitted. In other instances, other elements may be deemed necessary and added.

FIG. 1 illustrates the exemplary system that includes a thin computing device 20 that may interface with an electronic device (not shown). The electronic device may include one or more functional elements 51. For example, the electronic device may include any item having electrical and/or electronic components playing a role in a functionality of the item, such as a limited resource computing device, a game console, a digital camera, a cell phone, a printer, a refrigerator, a car, and an airplane. The thin computing device includes a processing unit 21, a system memory 22, and a system bus 23 that couples various system components including the system memory to the processing unit. The system bus may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device, such as during start-up, is stored in the ROM. A number of program modules may be stored in the ROM and/or RAM, including an operating system 28, one or more application programs 29, other program modules 30, and program data 31.

A user may enter commands and information into the computing device 20 through user input devices, such as a number of switches and buttons, illustrated as hardware buttons 44, which may be associated with the electronic device and connected via a suitable interface 45. Input devices may further include a touch-sensitive display screen 32 with suitable input detection circuitry 33. The output circuitry of the touch-sensitive display screen is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner, an external computer readable medium, or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device may further include or be capable of a connection with a network through a network port 42 and network interface 43, and/or through wireless port 46 and corresponding wireless interface 47. Such a connection may be provided to facilitate communication with other peripheral devices, including other computers, printers, and so on (not shown). It will be appreciated that the various components and connections shown are exemplary and other components and means of establishing communications links may be used.

The computing device 20 may be designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device may be designed to include a user interface having a physical keyboard (not shown).

The device functional elements 51 are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and/or a camera capturing and saving an image.

In the description that follows, certain embodiments may be described with reference to acts and symbolic representations of operations that are performed by one or more computing devices, such as the thin computing device 20 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Embodiments may be implemented with numerous other general-purpose or special-purpose computing devices, computing system environments, and/or configurations. Examples of well-known computing systems, environments, and/or configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Figure 2:
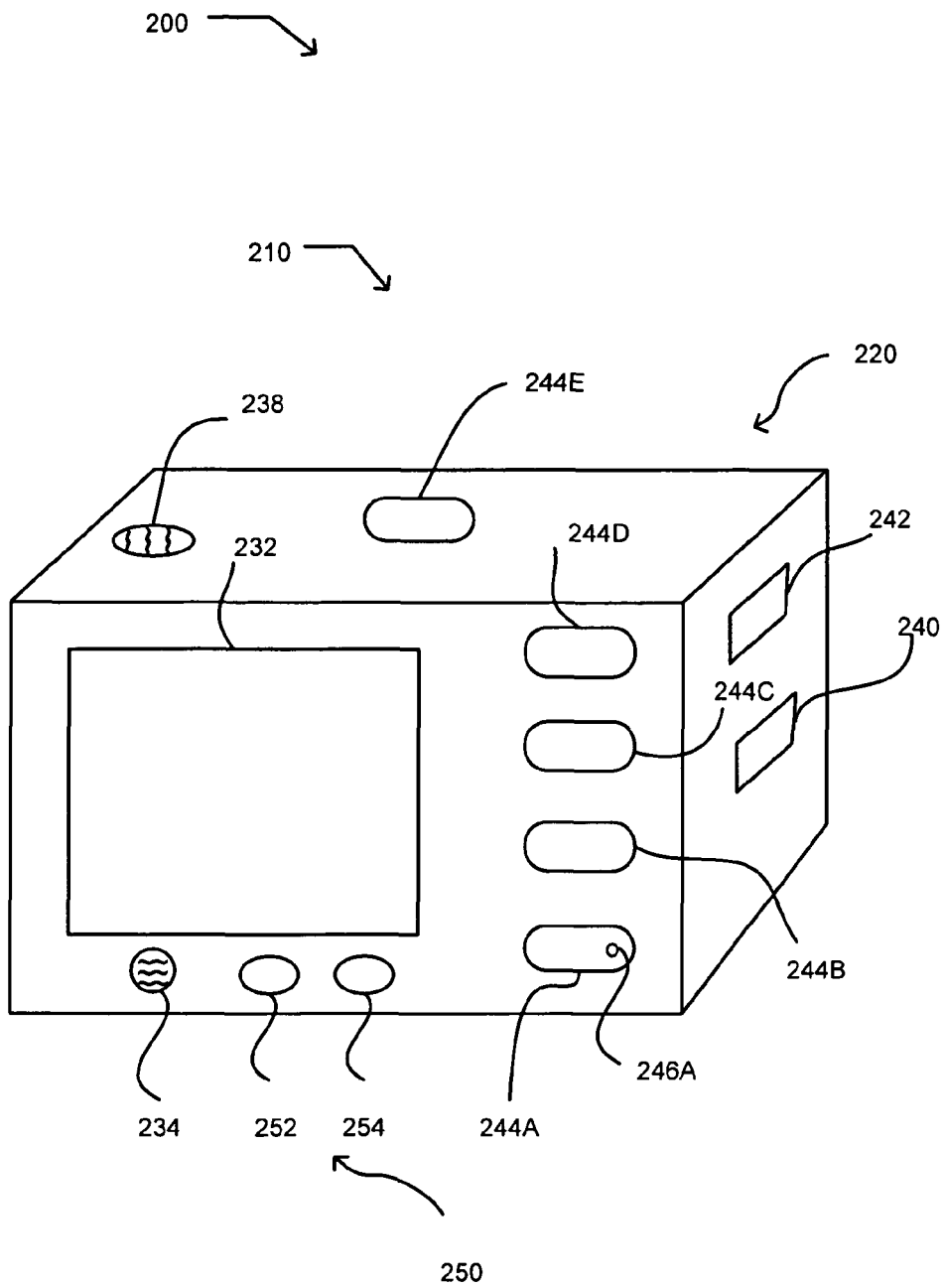
FIG. 2 illustrates an exemplary system in which embodiments may be implemented.

FIG. 2 illustrates an exemplary system 200 in which embodiments may be implemented. The system includes a digital camera 210 having image capture and image storage functionality. The digital camera 210 includes a computing device (not shown), such as the thin computing device 20 described in conjunction with FIG. 1, that is operable to interact with functional elements of the digital camera. The digital camera also includes a plurality of user interfaces 220. The plurality of interfaces 220 includes a display 232. In alternative embodiments, the display may provide a textual, a visual display, and/or a graphical display. In a further embodiment, the display may include touch screen functionality operable to accept a user input. The plurality of user interfaces of the camera also includes a microphone 234, a speaker 238, and a plurality of tangible buttons 244A-244E. One or more of the tangible buttons may include a light emitter, such as a light emitting device 246A. Further, one or more of the tangible buttons 244A-244E may include a vibrator operable to provide a tactile display. The display 232 and the tangible buttons 244A-244E may have any functionality appropriate to the digital camera. For example, the button 244E may be assigned to operate a camera element, such as a shutter function. The button 244A may be assigned an "enter" function, and buttons 244B and 244C may be respectively assigned a scroll up and scroll down function relative to a menu displayed on the display 232. The button 244D may be assigned to operate another camera element, such as a lens zoom function. The digital camera also includes context sensors 250, which may be selected, for example, to produce relevant information about an environment extrinsic to the digital camera. The context sensors are illustrated as an external temperature sensor 252 and a light intensity sensor 254. The digital camera further includes a USB port 240, a network port 242, and/or a wireless port (not shown).

In addition, the digital camera 210 includes a lens (not shown) and an image acquisition module (not shown). The image acquisition module controls the lens, a shutter, an aperture, and/or other elements as necessary to capture an image through the lens. In an embodiment, capturing images using digital cameras or camcorders may be equated with photography as performed by conventional film cameras. A captured image may be processed, stored, viewed, and/or distributed by the digital camera. The digital camera also includes a system memory (not shown), such as the system memory 22 of the thin computing device 20 of FIG. 1. The system memory includes saved operating systems and programs necessary to operate the digital camera. In addition, the digital camera may include a computer readable media (not shown), such as the computer readable medium described in conjunction with FIG. 3 below.

The digital camera 210 includes operability to receive a user input through an interface of the plurality of interfaces 220. For example, in an embodiment, detecting a user touch to the button 244D may be received as an instruction and/or a selection. Another detected user touch to another user interface of the plurality of user interfaces 220 may be received as another instruction and/or a selection. The user touch may be detected by a user interface physically incorporated in the aspect of the digital camera 210 or proximate thereto. In an alternative embodiment, an user input may be received by detecting a signal responsive to a sound or voice received by the microphone 234. For example, a detection and recognition of a signal responsive to a spoken command to the microphone 234 may be received as an instruction to activate a program associated with the digital camera. Further, a detection of a signal responsive to a sound or voice may be received by the microphone 234.

Figure 3:
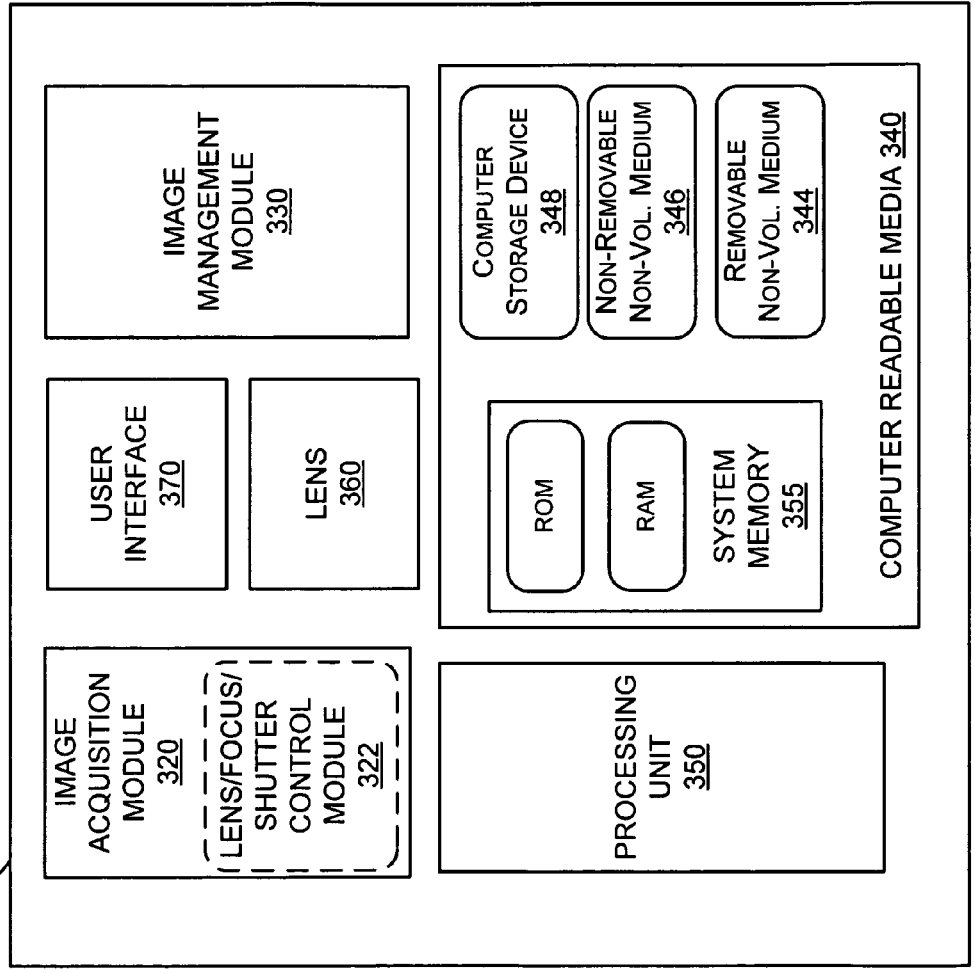
FIG. 3 illustrates an exemplary system in which embodiments may be implemented.

FIG. 3 illustrates an exemplary system 300 in which embodiments may be implemented. The system includes a digital camera 310. The digital camera includes an image acquisition module 320 operable to capture an image, an image management module 330, and a computer readable medium, illustrated as computer readable media 340.

In an embodiment, the digital camera 310 may include a computing device (not expressly shown) that handles any required processing. For example, the computing device may include at least a part of the system described in conjunction with FIG. 1, including the thin computing device 20, that may interface with at least one functional element of the digital camera. In an embodiment, the digital camera may include a processing unit, illustrated as a processing unit 350, and a system memory 355, which may be substantially similar to the processing unit 21 and the system memory 22 respectively of FIG. 1. In another embodiment, the digital camera may include at least a part of the exemplary system 200 and/or the digital camera 210 described in conjunction with FIG. 2.

The image management module 330 includes an operability to save a captured image at a resolution in the computer readable medium 340 and in a user-accessible form. In an embodiment, the operability to save the captured image at a resolution in the computer readable medium and in a user-accessible form includes an operability to save a captured image in a format at least substantially suitable for presentation by a visual display of the digital camera 310, such as a display screen. For example, the operability to save a captured image at a resolution in the computer readable medium and in a user-accessible form may include an operability to save a captured image at a resolution in a JPEG format, a GIF format, a TIFF format, or a PDF format. In another embodiment, the operability to save the captured image at a resolution in the computer readable medium and in a user-accessible form includes an operability to save the captured image at a resolution in the computer readable medium after data representative of the captured image has been decoded and processed from a raw format. Typically, the raw data is decoded and/or processed from a raw format, i.e., raw image data, into a JPEG format, a GIF format, a TIFF format, or a PDF format. In a further embodiment, the operability to save the captured image at a resolution in the computer readable medium and in a user-accessible form includes an operability to save the captured image in a form accessible to a user of the digital camera in the computer readable medium. For example, the form accessible to a user of the digital camera may include a JPEG format, a GIF format, a TIFF format, a PDF format, or a raw format where the digital camera allows a user access to a saved captured image in a raw format.

In an embodiment, an "image" may include a full image. In another embodiment, an "image" may include a portion of an image, a segment of a full image, a thumbnail of an image, and/or an icon that pertains to an image. Another embodiment of an "image" may include a photograph and/or a digital image that can be captured by an image capture device such as, for example, the digital camera 310. Certain embodiments of a streaming image may include a video that may be captured by the digital camera, such as, for example, a digital camcorder camera.

The term "resolution" may include an indication of a measurement of image detail, such as may be expressed as pixels per inch, dots per inch, or samples per inch, etc. In certain embodiments, a file size of an image is a function of its resolution, and in certain embodiments of relatively limited storage-capability cameras, relatively few high-resolution images can be saved.

In another embodiment, a "user-accessible form" may include at least one of a location in the computer readable medium that allows a user to access a file saved therein, a file formatted to allow a user of the digital camera 310 to view and/or manipulate the captured image, a property of the captured image written to the computer readable medium, and/or an organization of the computer readable medium that allows a user to access a file saved therein. For example, data indicative of the captured image written to a hard drive in a JPEG format generally allows a user to view and/or manipulate the captured image. In an embodiment, a user-accessible storage medium may include all or any portion of any computer readable storage medium that allows a user, typically through a user interface, to act with respect to and/or interact with the image, such as viewing the image, manipulating the image, and/or directing the image to another location.

The image management module 330 also includes an operability to decrease the resolution of the saved captured image in the computer readable medium if a condition is met. In an embodiment, the condition may include a condition corresponding in part or whole to a state of the computer readable medium, a presence and/or absence of a predetermined content of the saved captured image, a characteristic of the saved image, an image storage administrative criterion, and/or a temporal criterion. In a further embodiment, a condition does not include an automatic or standing condition that normally occurs upon completion of a processing, for example, completion of decoding raw image data into a more machine usable and/or user viewable format.

Examples of decreasing a resolution of a saved captured image include, but are not limited to, changing a resolution of a saved captured image, resampling a saved captured image, adjusting an exposure of a saved captured image, adjusting some image content of a saved captured image, and/or adjusting image composition of a saved captured image. As described within this document, certain embodiments of the decreasing a resolution of a saved captured image are configurable to decrease the resolution of the image such as by utilizing pixel-combination and/or combination of multiple images. The decreasing a resolution of a saved captured image may include altering image intensity and/or color values. The decreasing a resolution of a saved captured image may in certain embodiments, but not others, be equated to sizing the resolution of an image downward, and may other embodiments be implemented by removing pixels from the saved captured image. The decreasing a resolution of a saved captured image may pertain in certain embodiments, but not others, to altering the color values and/or the color intensities of a particular image. The decreasing a resolution of a saved captured image may pertain to decreasing the density of the pixels forming the image. During a resolution decreasing process, in certain embodiments of a display or projector, a footprint of pixels may be suitably altered to effectively change the resolution of the at least one image.

In an embodiment, the computer readable media 340 may include a variety of computer readable media products. The computer readable media may include any storage media accessible by a computing device, and includes both removable and non-removable media. By way of example, and not of limitation, computer-readable media may include any computer storage media. Computer storage media includes removable and non-removable media implemented in any method or technology for storage of information such as computer-readable instructions, data structures, program modules, or other data. Computer storage media may include, but are not limited to, magnetic devices, such as magnetic disk storage, magnetic cassettes, magnetic tape, or other magnetic storage devices; optical devices, such as CD-ROM, digital versatile disks (DVD), or other optical disk storage; memory cards, such a flash memory card; and/or any other medium which may be used to store the captured information and which can be accessed by a computing device. Combinations of any of the above may also be included within the scope of a computer-readable medium.

FIG. 3 illustrates an embodiment where the computer readable media 340 includes at least one instance of a computer readable medium. Illustrated instances of a computer readable medium include a computer storage device 348, a non-removable non-volatile medium 346, and/or a removable non-volatile medium 344. In an embodiment, the computer storage device may include any device capable of storing data, such as, for example, a mass storage device, a disk drive, and/or a tape drive. In another embodiment, the non-removable non-volatile medium may include a non-volatile magnetic disk or other medium. In a further embodiment, the removable non-volatile medium may include an optical disk such as a CD ROM, magnetic tape cassettes, flash memory cards, DVDs, and/or digital video tape.

In an embodiment, the computer readable medium 340 includes a non-volatile computer storage device. In another embodiment, the computer readable medium includes a non-volatile computer readable medium. In a further embodiment, the computer readable medium includes a removable non-volatile computer readable medium.

In an embodiment, the image acquisition module 320 operable to capture an image includes an image acquisition module operable to capture a still image, an image stream, and/or a combination of a still image and an image stream. In another embodiment, the image acquisition module operable to capture an image includes an image acquisition module operable to capture at least one of a visual image, an audio image, and/or a combination of a visual image and an audio image. In a further embodiment, the image acquisition module operable to capture an image includes an image acquisition module operable to capture an image in response to a received instruction from another digital device. The received instruction from another digital device may include an instruction received from another digital camera. The received instruction may direct capture of the image, or may include data responsive to which the image acquisition module captures the image.

In an embodiment, the image management module 330 operable to save a captured image at a resolution in a computer readable medium and in a user-accessible form includes an image management module operable to save a captured image at a resolution in the computer readable medium and in a user-accessible album of images stored in a computer readable medium. In another embodiment, the image management module operable to save a captured image at a resolution in a computer readable medium includes an image management module operable to save a captured image at a resolution in the computer readable medium and in a user-accessible collection of images stored in a computer readable medium. In a further embodiment, the image management module operable to save a captured image at a resolution in the computer readable medium and in a user-accessible form includes an image management module operable to save a captured image at a resolution in a user-accessible data structure.

In an embodiment, the image management module 330 operable to decrease the resolution of the saved captured image in the computer readable medium if a condition is met includes an image management module operable to decrease the resolution of the saved captured image in the computer readable medium using a lossy compression algorithm if a condition is met. In another embodiment, the image management module operable to decrease the resolution of the saved captured image in the computer readable medium if a condition is met includes an image management module operable to decrease the resolution of the saved captured image in the computer readable medium if a time exceeds a preselected time threshold. The preselected time threshold may exceed five seconds. The preselected time threshold may exceed at least a selected one of ten seconds, thirty seconds, one minute, thirty minutes, ninety minutes, five hours, twelve hours, one day, one week, one month, or one year.

In a further embodiment, the image management module 330 operable to decrease the resolution of the saved captured image in the computer readable medium if a condition is met includes an image management module operable to decrease the resolution of the saved captured image in the computer readable medium if a time value is inside a preselected time window. In an embodiment, the image management module operable to decrease the resolution of the saved captured image in the computer readable medium if a condition is met includes an image management module operable to decrease the resolution of the saved captured image in the computer readable medium if a condition is met where the condition corresponds to at least one of a storage space availability in the computer readable medium, a user established parameter, a preselected content of the image, and/or a parameter established by a storage management algorithm. In another embodiment, the image management module operable to decrease the resolution of the saved captured image in the computer readable medium if a condition is met includes an image management module operable to decrease the resolution of the saved captured image in the computer readable medium if a condition independent of the operation to save a captured image at a resolution in the computer readable medium is met. In a further embodiment, the image management module operable to decrease the resolution of the saved captured image in the computer readable medium if a condition is met includes an image management module operable to decrease the resolution of the saved captured image in the computer readable medium if a condition responsive to an examination of at least one other captured image saved in the computer readable medium is met. For example, a condition responsive to an examination of at least one other captured image saved in the computer readable medium may include examining a content and/or context of the at least one or more other saved captured images for a repetition and/or duplication. If at least one other saved captured image is examined and found to be repetitive and/or duplicative of the saved captured image, the condition would be met and the image management module would operate to reduce the resolution of the saved captured image. In an alternative embodiment, the image management module may include an operability to reduce the resolution of the at least one other saved image in response to the condition being met.

In an embodiment, the image management module 330 may further include an image management module operable to further decrease the resolution of the captured image saved in the computer readable medium if another condition is met.

FIGS. 4A-C illustrate an exemplary operation 400 that decreases the resolution of the saved captured image in the computer readable medium. The operation is described using the exemplary system 300 and the digital camera 310 of FIG. 3 as an example. In operation of an embodiment of the exemplary system, a user may compose a picture by orientating the lens 360 toward a subject in a scene. The user may communicate their preferences about the intended picture to the digital camera using elements of the user interface 370. Upon shutter activation, an imaging chip 322 of the image acquisition module 320 generates electrical signals corresponding to the scene in a raw-format. A processing unit 350 and/or an image management module 330 of the digital camera decodes and/or processes the raw-format image of the scene into a format, such as a JPEG format, a GIF format, a TIFF format, or a PDF format. The decoding and/or processing typically involve the system memory 355 of FIG. 3. The image management module 330 then saves the captured image in a post-decoded/processed format, such as the JPEG format, at an initial resolution 410 in the computer readable medium 340. FIG. 4A illustrates the saved captured image in the post-decoded/processed format, such as a JPEG format, in the file at, at the initial resolution 410 in the computer readable medium. Typically, the file will have an initial file size measured in bytes.

If a condition is met, the image management module 330 decreases the resolution of the saved captured image in the computer readable medium 340 from the initial resolution 410 to a decreased resolution 415. For example, a condition may include whether a user has not caused the digital camera 310 to display the captured saved image at the initial resolution 410 for more than ten seconds in the 30 days immediately after the image was captured. The image management module monitors for the condition being met. If the condition is met, i.e., a user has not caused the digital camera to display the saved captured image at the initial resolution for more than 10 seconds during the 30 days after the image was captured, the image management module decreases the resolution of the saved captured image in the computer readable medium. The resolution of the saved captured image is decreased from the initial resolution 410 to a lesser or decreased resolution, illustrated as the decreased resolution 415.

If another condition is met, the image management module 330 may further decrease the decreased resolution 415 of the saved captured image in the computer readable medium 340. For example, a condition may include whether a user has not caused the digital camera 310 to display the captured saved image at its decreased resolution 415 for more than ninety seconds during the 90 days after the resolution was reduced from the file 410. If the condition is met, i.e., a user has not caused the digital camera to display the saved captured image for more than ninety seconds during the 90 days after the saved captured image was reduced, the image management module further decreases the resolution of the written captured image in the computer readable medium. The resolution is decreased from the decreased resolution 415 to a further decreased resolution, illustrated as a further decreased resolution 420. In an embodiment, each decreased resolution is selected to use less file storage space in the computer readable medium than its predecessor does. In an embodiment, less viewed or lower user-valued files have their resolution degraded over time to maximize available storage capacity for newly captured images and/or frequently viewed images.

Figure 5:
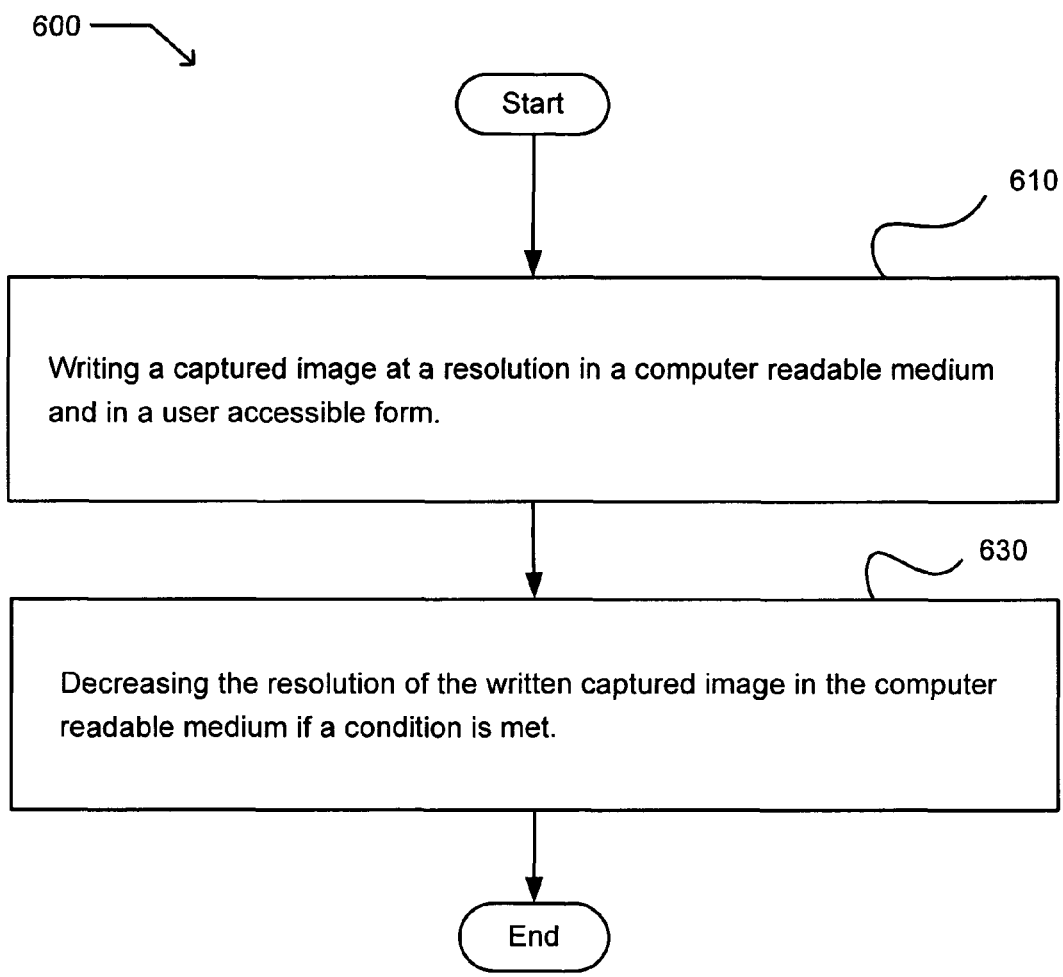
FIG. 5 illustrates an exemplary operational flow.

FIG. 5 illustrates an exemplary operational flow 600. The exemplary operational flow may be implemented in the exemplary system 300 described in conjunction with FIG. 3. After a start operation, a storage operation 610 writes a captured image at a resolution in a computer readable medium and in a user-accessible form. A transformation operation 630 decreases the resolution of the written captured image in the computer readable medium if a condition is met. The operational flow then proceeds to an end operation.

Figure 6:
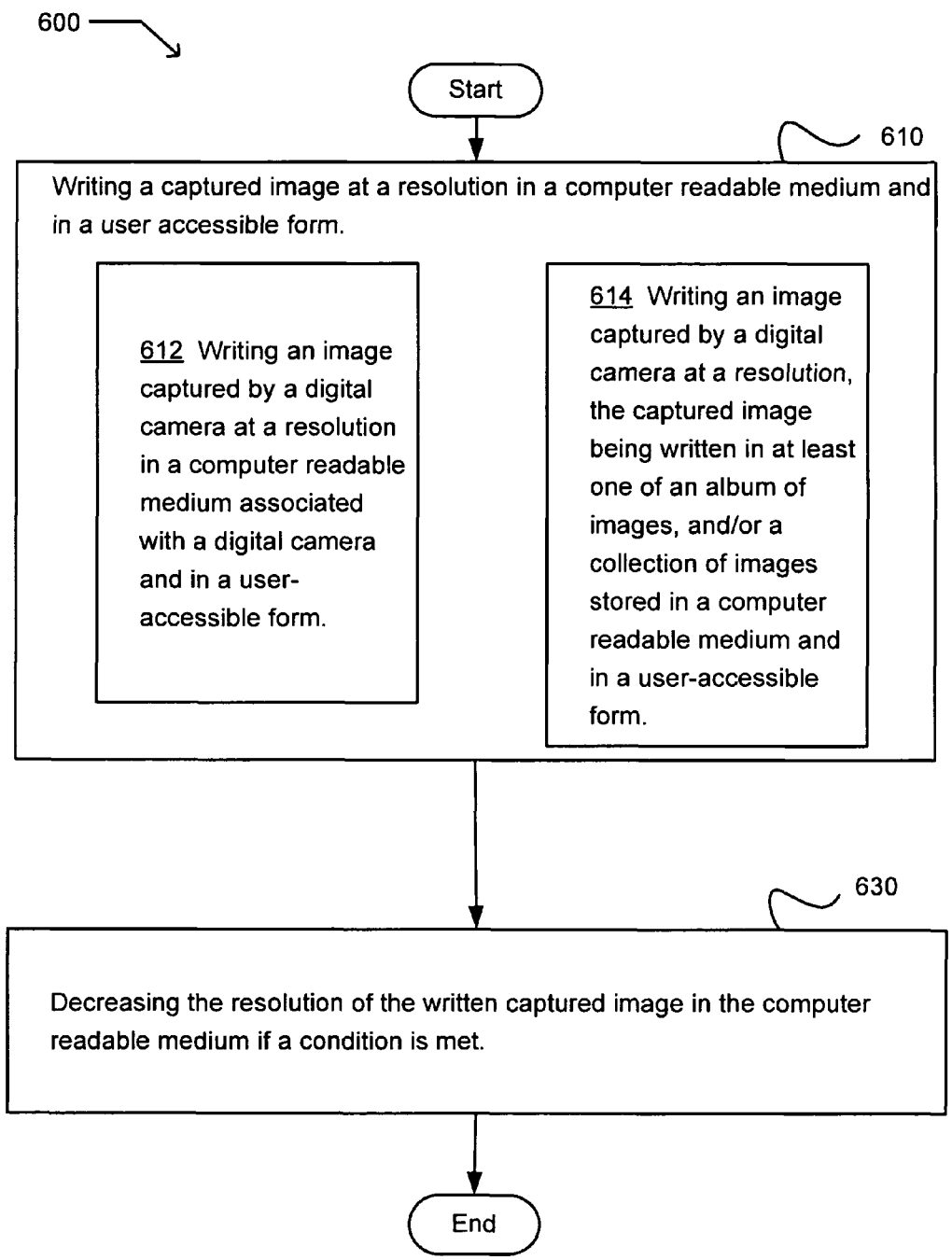
FIG. 6 illustrates an alternative embodiment of the exemplary operational flow of FIG. 5.

FIG. 6 illustrates an alternative embodiment of the exemplary operational flow 600 of FIG. 5. The storage operation 610 may include at least one additional operation. The at least one additional operation may include an operation 612, and/or an operation 614. The operation 612 writes an image captured by a digital camera at a resolution in a computer readable medium associated with a digital camera and in a user-accessible form. The operation 614 writes an image captured by a digital camera at a resolution and in a user-accessible form, the captured image being written in at least one of an album of images, and/or a collection of images stored in a computer readable medium.

Figure 7:
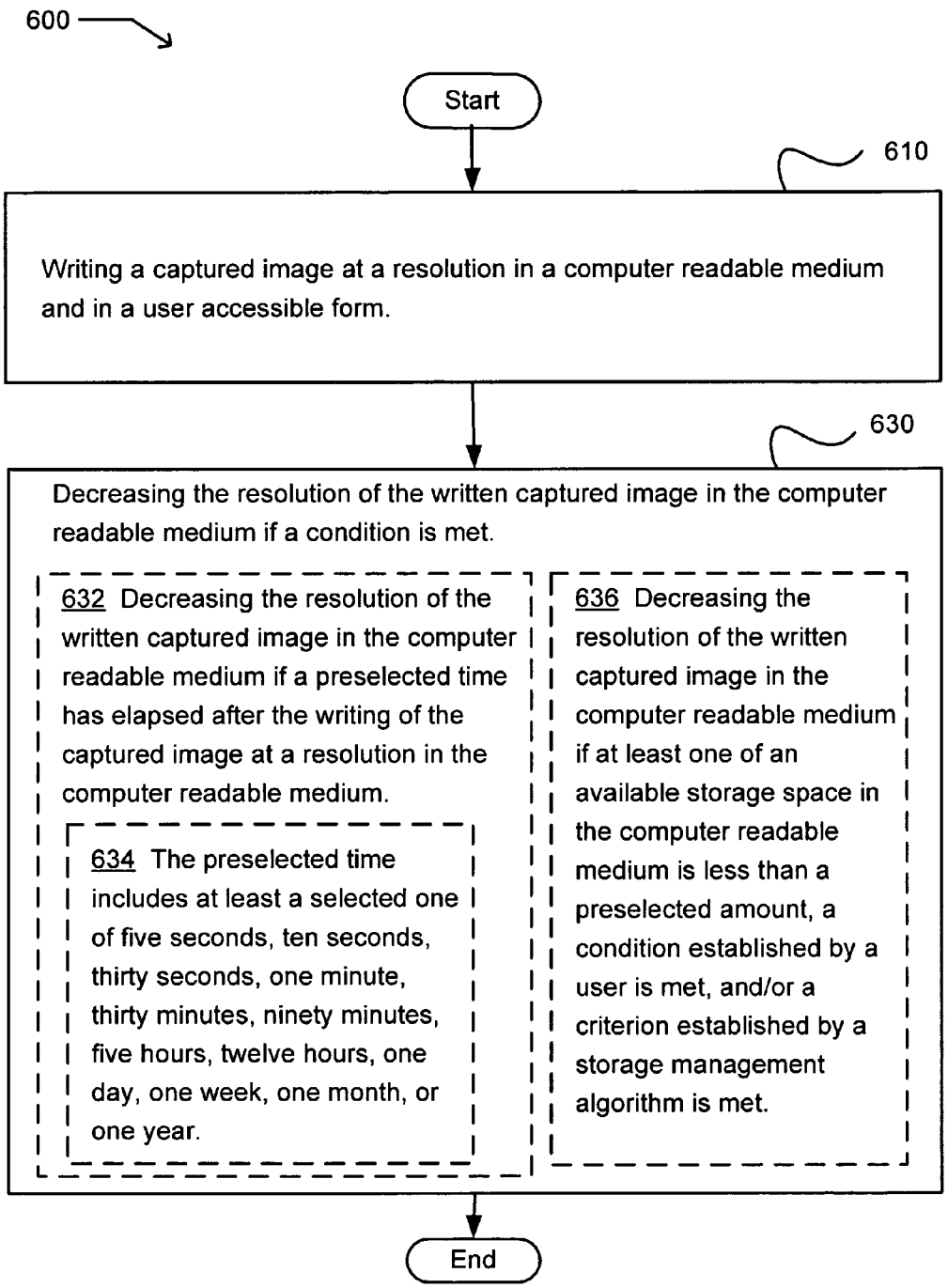
FIG. 7 illustrates an alternative embodiment of the exemplary operational flow of FIG. 5.

FIG. 7 illustrates an alternative embodiment of the exemplary operational flow 600 of FIG. 5. The transformation operation 630 may include at least one additional operation. The at least one additional operation may include an operation 632, and/or an operation 636. The operation 632 decreases the resolution of the written captured image in the computer readable medium if a preselected time has elapsed after the writing of the captured image at a resolution in the computer readable medium. The operation 632 may include at least one additional operation, such as the operation 634. At the operation 634, the preselected time includes at least a selected one of five seconds, ten seconds, thirty seconds, one minute, thirty minutes, ninety minutes, five hours, twelve hours, one day, one week, one month, or one year. The operation 636 decreases the resolution of the written captured image in the computer readable medium if at least one of an available storage space in the computer readable medium is less than a preselected amount, a condition established by a user is met, and/or a criterion corresponding to a storage management algorithm is met.

Figure 8:
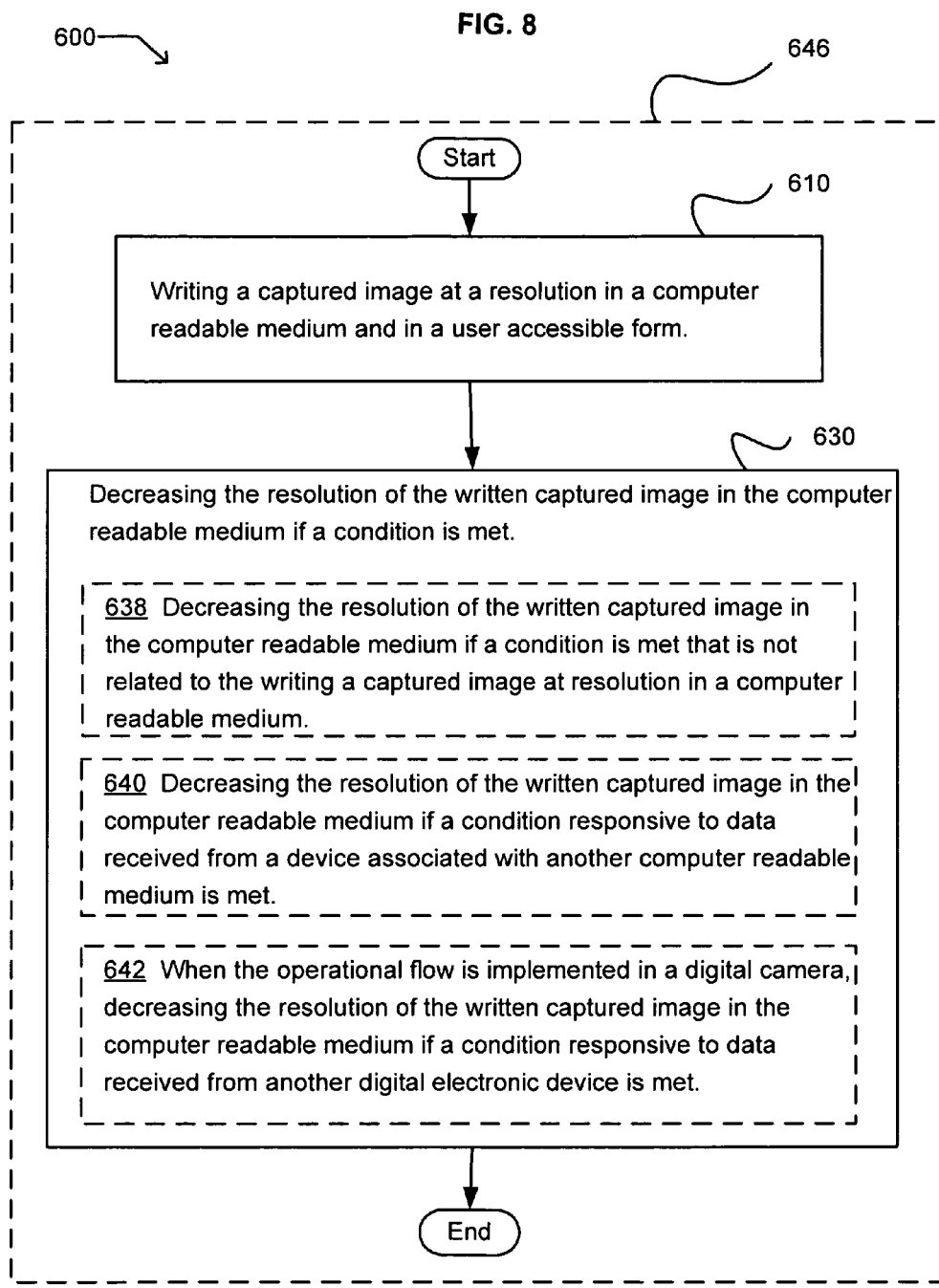
FIG. 8 illustrates an alternative embodiment of the exemplary operational flow of FIG. 5.

FIG. 8 illustrates an alternative embodiment of the exemplary operational flow 600 of FIG. 5. The operational flow may be implemented in a handheld digital camera 646. The transformation operation 630 may include at least one additional operation. The additional operation may include an operation 638, an operation 640, and/or an operation 642. The operation 638 decreases the resolution of the written captured image in the computer readable medium if a condition is met that is not related to the writing a captured image at resolution in a computer readable medium. The operation 640 decreases the resolution of the written captured image in the computer readable medium if a condition responsive to data received from a device associated with another computer readable medium is met. When the operational flow is implemented in a digital camera, the operation 642 decreases the resolution of the written captured image in the computer readable medium if a condition responsive to data received from another digital device is met.

Figure 9:
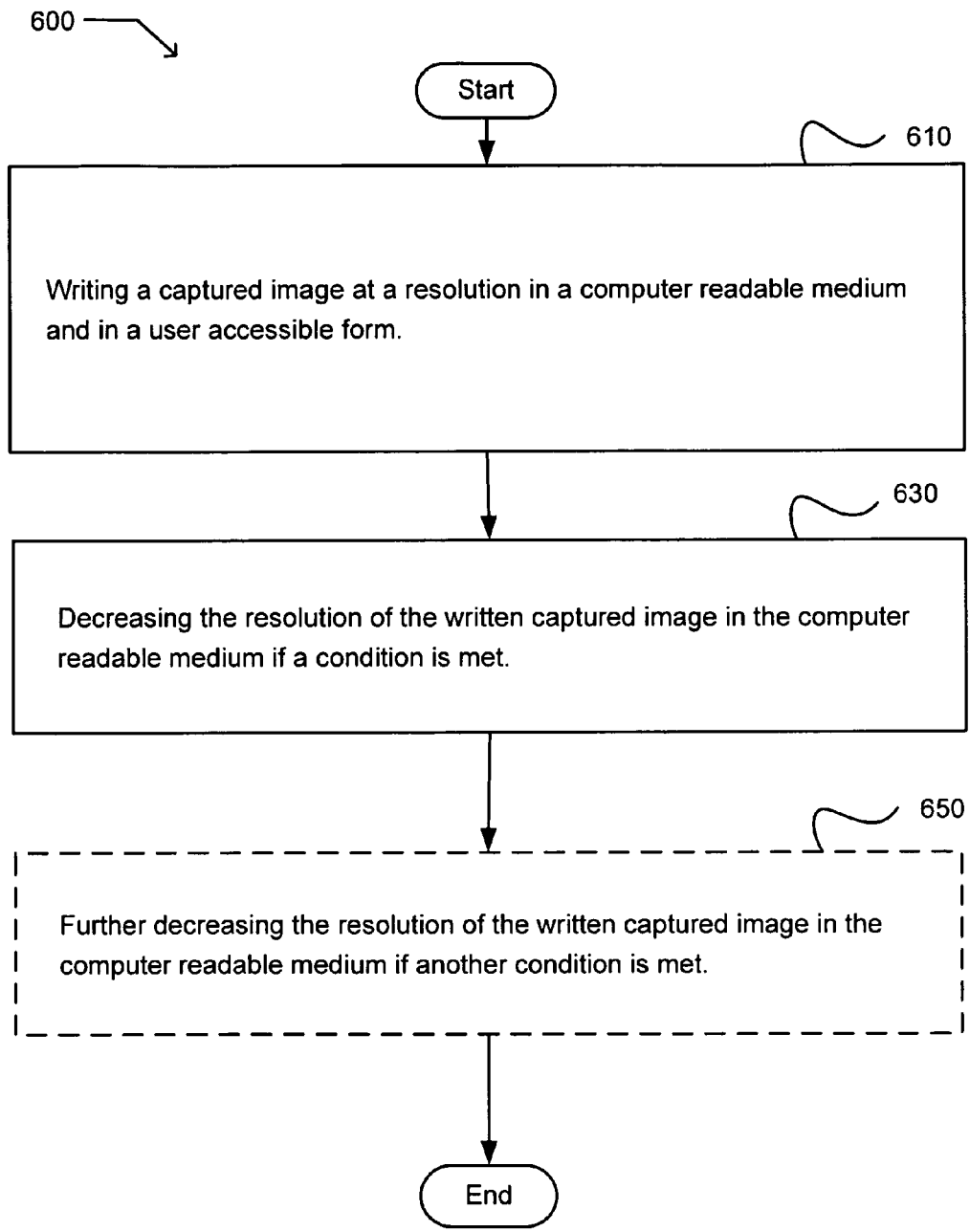
FIG. 9 illustrates an alternative embodiment of the exemplary operational flow of FIG. 5.

FIG. 9 illustrates an alternative embodiment of the exemplary operational flow 600 of FIG. 5. The operational flow may include at least one additional operation, such as an operation 650. The operation 650 further decreases the resolution of the written captured image in the computer readable medium if another condition is met.

Figure 10:
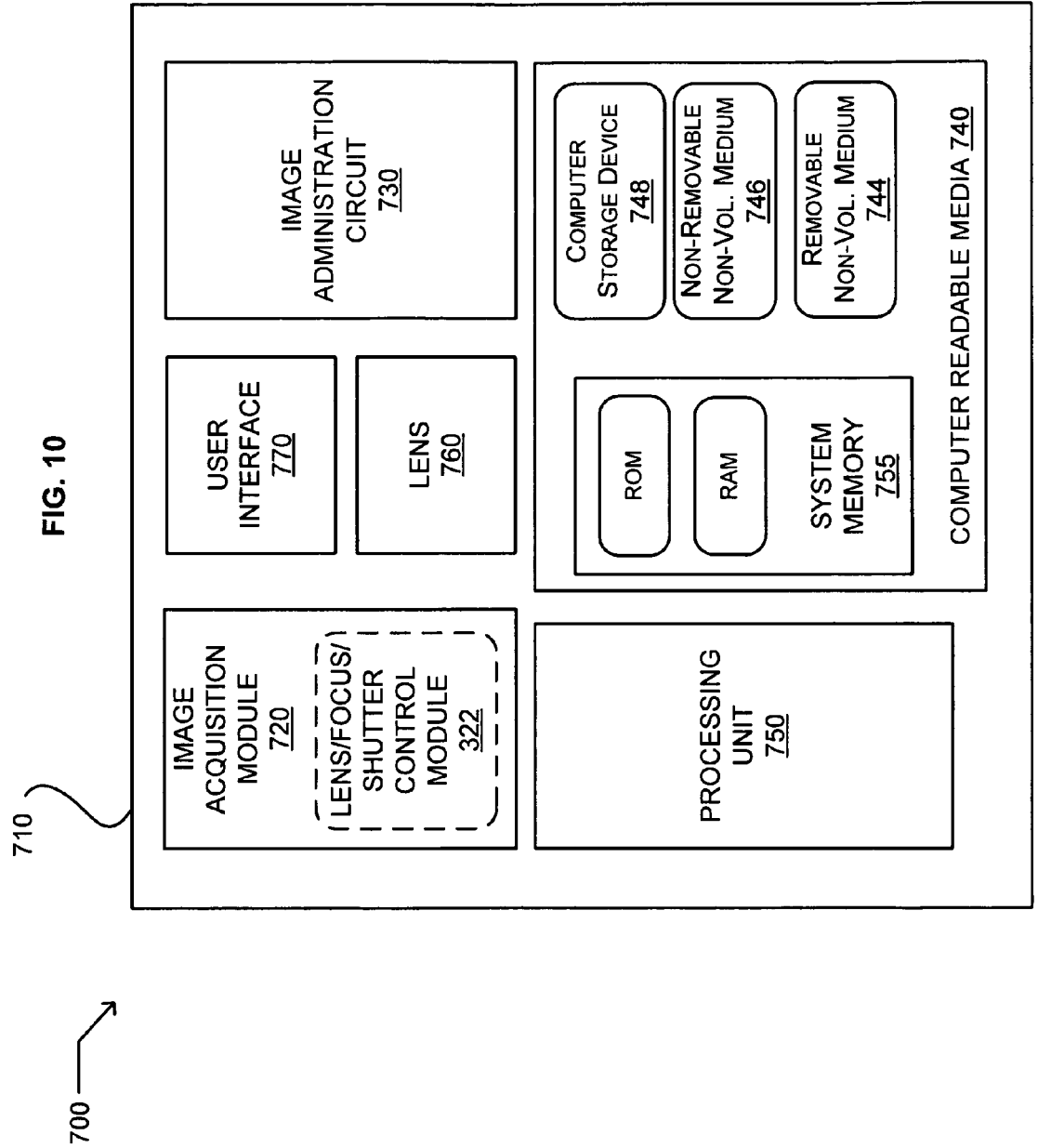
FIG. 10 illustrates an exemplary environment in which embodiments may be implemented.

FIG. 10 illustrates an exemplary environment 700 in which embodiments may be implemented. The exemplary environment includes a device 710, which may include elements that are at least substantially similar to the digital camera 310 of FIG. 3. The device includes an image acquisition module 720 operable to capture an image, a computer readable medium, illustrated as a computer readable media 740, and an image administration circuit 730. The image administration circuit includes an image administration circuit for saving a captured image at a first resolution in the computer readable medium. The image administration circuit also includes a image administration circuit for saving the captured image in the computer readable medium at a second resolution that is less than the first resolution, and for removing the captured image saved at the first resolution from the computer readable medium, both if a condition is met.

In an embodiment, the image administration circuit 730 for saving a captured image in the computer readable medium at a first resolution includes an image administration circuit for saving a captured image at a first resolution in at least one of a nonvolatile, a removable, and/or non-removable media implemented in any method and/or technology for storage of digital information. In another embodiment, the image acquisition module 720 operable to capture an image includes an image acquisition module operable to capture at least one of a still image, an image stream, and/or a combination of a still image and an image stream. In a further embodiment, the image acquisition module operable to capture an image includes an image acquisition module operable to capture at least one of visual image, an audio image, and/or a combination of a visual image and an audio image.

In an embodiment, the image acquisition module 720 operable to capture an image includes an image acquisition module operable to capture a real-world image. In another embodiment, the image administration circuit 730 for saving a captured image at a first resolution in the computer readable medium includes an image administration circuit for saving a captured real-world image at a first resolution in the computer readable medium. In a further embodiment, the image acquisition module operable to capture an image includes an image acquisition module operable to capture a virtual-world image. In another embodiment, the image administration circuit for saving a captured image at a first resolution in the computer readable medium includes an image administration circuit for saving a captured virtual-world image at a first resolution in the computer readable medium.

In another embodiment, the image administration circuit 730 for saving a captured image at a first resolution in the computer readable medium includes an image administration circuit for saving a captured image at a first resolution in the computer readable medium and in a user-accessible form. In a further embodiment, the image administration circuit for saving a captured image at a first resolution in the computer readable medium and in a user-accessible form includes an image administration circuit for saving a captured image at a first resolution in the computer readable medium and in a user-accessible location. In an embodiment, the image administration circuit for saving a captured image at a first resolution in the computer readable medium and in a user-accessible form includes an image administration circuit for saving a captured image at a first resolution in a computer readable medium that allows user access to the saved captured image. In a further embodiment, the image administration circuit for saving a captured image at a first resolution in the computer readable medium and in a user-accessible form includes an image administration circuit for saving a captured image at a first resolution in a computer readable medium configured for user access to the saved captured image.

In an embodiment, the image administration circuit 730 for saving the captured image in the computer readable medium at a second resolution that is less than the first resolution includes an image administration circuit for saving the captured image in the computer readable medium at a resolution reduced from the first resolution. In another embodiment, the image administration circuit for saving the captured image in the computer readable medium at a second resolution that is less than the first resolution if a condition is met includes an image administration circuit for saving the captured image in the computer readable medium at a second resolution where at least a portion of the saved captured image has a resolution less than the first resolution. In a further embodiment, the image administration circuit for saving the captured image in the computer readable medium at a second resolution that is less than the first resolution includes an image administration circuit for reducing the resolution of the captured image from the first resolution into the second resolution and for saving the captured image in the computer readable medium at the second resolution. In an embodiment, the image administration circuit for saving the captured image in the computer readable medium at a second resolution that is less than the first resolution includes an image administration circuit for reducing the resolution of at least one selected frame of a streaming captured image from the first resolution into the second resolution and not reducing at least one other selected frame of the streaming captured image.

In an embodiment, the image administration circuit 730 for removing the captured image saved at the first resolution from the computer readable medium includes an image administration circuit for deleting the captured image saved at the first resolution from the computer readable medium. In another embodiment, the image administration circuit for removing the captured image saved at the first resolution from the computer readable medium includes an image administration circuit for communicating the captured image saved at the first resolution to another computer readable medium. In an embodiment, the another computer readable medium may be physically associated with the device. In further embodiment, the another computer readable medium may not physically associated with the device.

In an embodiment, the image administration circuit 730 for communicating the captured image saved at the first resolution to another computer readable medium includes an image administration circuit for communicating the captured image saved at the first resolution to another computer readable medium and acquiring a track-back link to the communicated captured image. In another embodiment, the image administration circuit for removing the captured image saved at the first resolution from the computer readable medium includes an image administration circuit for communicating the captured image saved at the first resolution to at least one of another computer readable medium that is a less accessible computer readable medium, a slower computer readable medium, a cheaper computer readable medium, a temporarily available computer readable medium, an intermittently available computer readable medium, a more secure computer readable medium, a less secure computer readable medium, a public computer readable medium, a private computer readable medium, and/or a computer readable medium that is less accessible in terms of a location and/or a rate and/or a format.

In an embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a preselected time has elapsed since the captured image at a first resolution was saved in the computer readable medium. In a further embodiment, the image administration circuit for saving the captured image in the computer readable medium at a second resolution that is less than the first resolution if a condition is met includes an image administration circuit for saving the captured image in the computer readable medium at a second resolution that is less than the first resolution if available storage space in the computer readable medium is less than a preselected threshold. For example, the available storage space in the computer readable medium may include a presently available storage in the computer readable medium that is less than a preselected threshold, and/or predicted availability of storage in the computer readable medium that is less than a preselected threshold.

In another embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a condition established by a user is met. The condition established by a user may include a user-selected condition, a user-created condition, and/or a user-determined condition. In a further embodiment, the image administration circuit for saving the captured image in the computer readable medium at a second resolution that is less than the first resolution if a condition is met includes an image administration circuit for saving the captured image in the computer readable medium at a second resolution that is less than the first resolution if an image resolution changing criterion established by a storage administration criterion is met. In an embodiment, the storage administration criterion may correspond to image content, image content attributes, time, storage space, presence and/or absence of a selected subject, a frequent presence of a selected subject in other saved captured images, an at least substantial similarity to other saved captured images, and/or an at least substantial similarity to other saved captured images having a commonality; such as recently captured, captured in a time frame, and/or captured in temporal or spatial proximity. For example, a storage administration criterion may include keeping only one high resolution saved captured image of my son from all those captured during the month of December. In another example, a storage administration criterion may include keeping, i.e., not deceasing the resolution of sufficient images to enable some task or goal, such as keeping just enough images to construct a panorama, to create a high dynamic range composite, and/or an infinite depth of field image.

In an embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a condition corresponding to data received from another digital device is met. In another embodiment, the image administration circuit for saving the captured image in the computer readable medium at a second resolution that is less than the first resolution if a condition is met includes an image administration circuit for saving the captured image in the computer readable medium at a second resolution that is less than the first resolution if a condition responsive to an examination of at least one other captured image saved in the computer readable medium is met. In a further embodiment, the another digital device includes an image acquisition module operable to capture an image. In another embodiment, the device includes a digital camera. In a further embodiment, the device includes a handheld digital camera.

In an embodiment, the an image administration circuit 730 further includes an image administration circuit for saving the captured image in the computer readable medium at a third resolution that is less than the second resolution and removing from the computer readable medium the captured image saved at the second resolution, if another condition is met.

Figure 11:
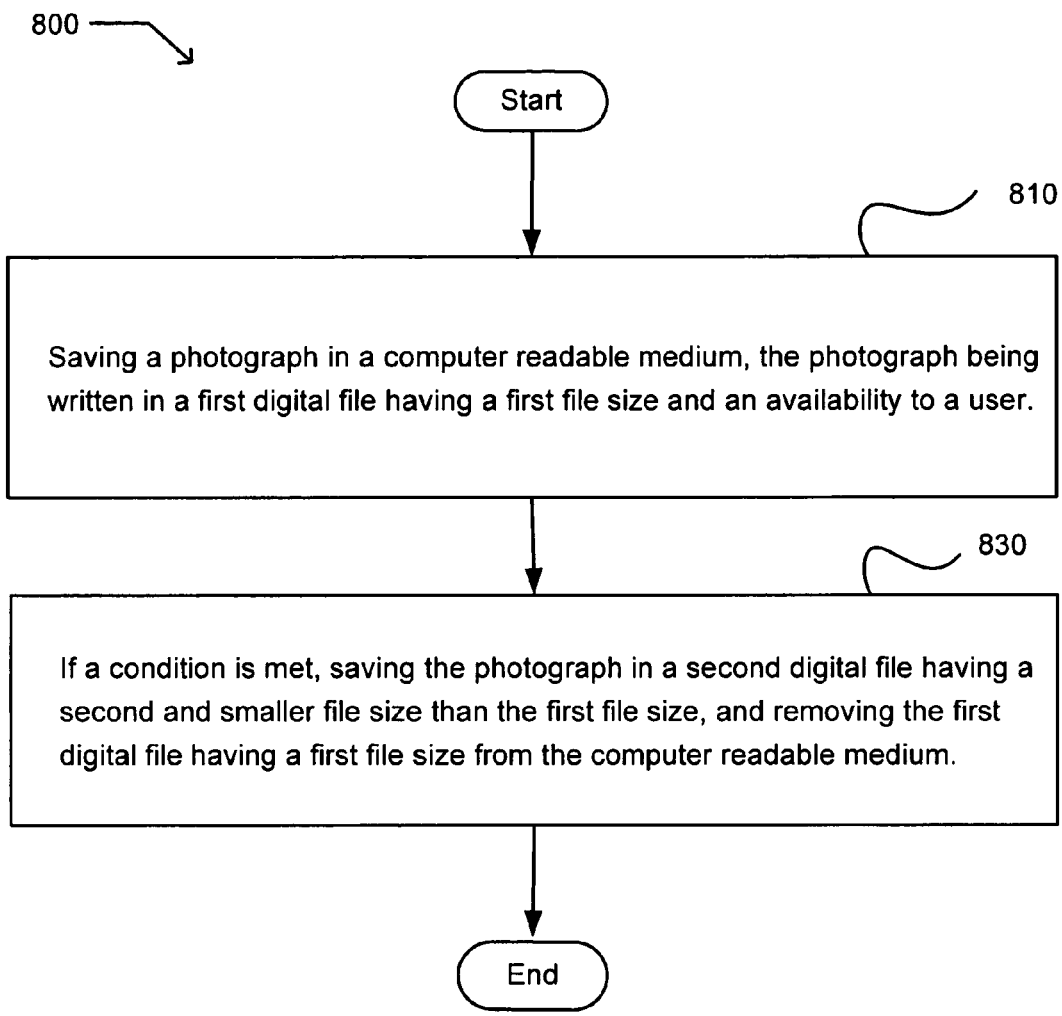
FIG. 11 illustrates an exemplary operational flow.

FIG. 11 illustrates an exemplary operational flow 800. After a start operation, a storage operation 810 saves a photograph in a computer readable medium, the photograph being written in a first digital file having a first file size and an availability to a user. For example, in an embodiment, after a raw image is processed, data representative of the photograph is written into a semi-permanent or permanent storage medium for a later retrieval. A reduction operation 830 saves the photograph in a second digital file having a second and smaller file size than the first file size, and removes the first digital file having a first file size from the computer readable medium, both if a condition is met. The operational flow then proceeds to an end operation.

In an embodiment, a photograph may include a single picture of a scene, a stream of pictures of a scene that may be static or dynamic, and/or a combination thereof. In another embodiment, the image acquisition module operable to capture an image includes an image acquisition module operable to capture at least one of a visual picture, a sound, and/or a combination thereof.

Figure 12:
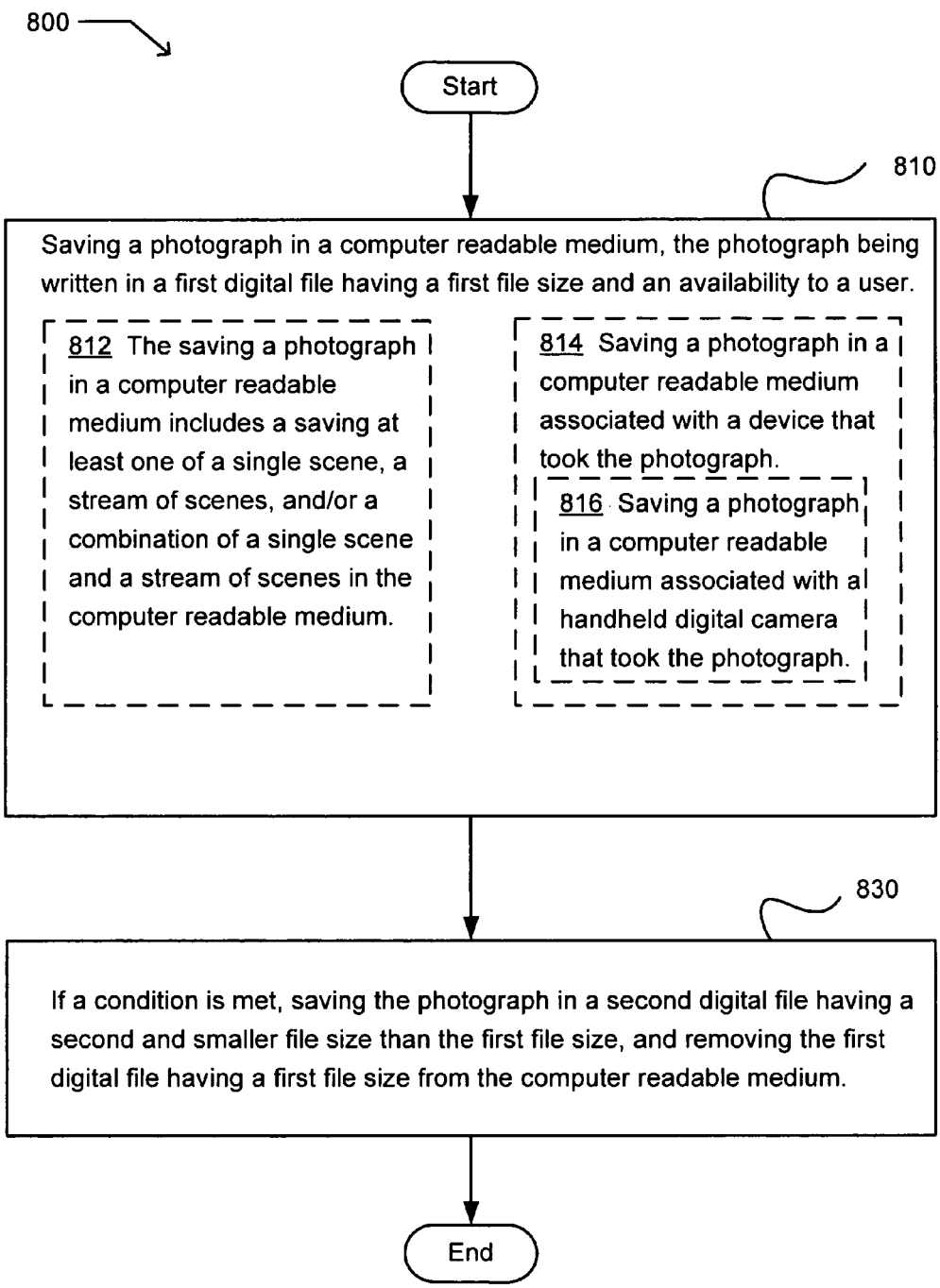
FIG. 12 illustrates an alternative embodiment of the exemplary operational flow of FIG. 11.

FIG. 12 illustrates an alternative embodiment of the exemplary operational flow 800 of FIG. 11. The storage operation 810 may include at least one additional operation. The at least one additional operation may include an operation 812 and/or an operation 814. At the operation 812, the saving a photograph in a computer readable medium includes a saving at least one of a single scene, a stream of scenes, and/or a combination of a single scene and a stream of scenes in the computer readable medium. The operation 814 saves a photograph in a computer readable medium associated with a device that took the photograph. The operation 814 may include at least one additional operation, such as the operation 816. The operation 816 saves a photograph in a computer readable medium associated with a handheld digital camera that took the photograph.

Figure 13:
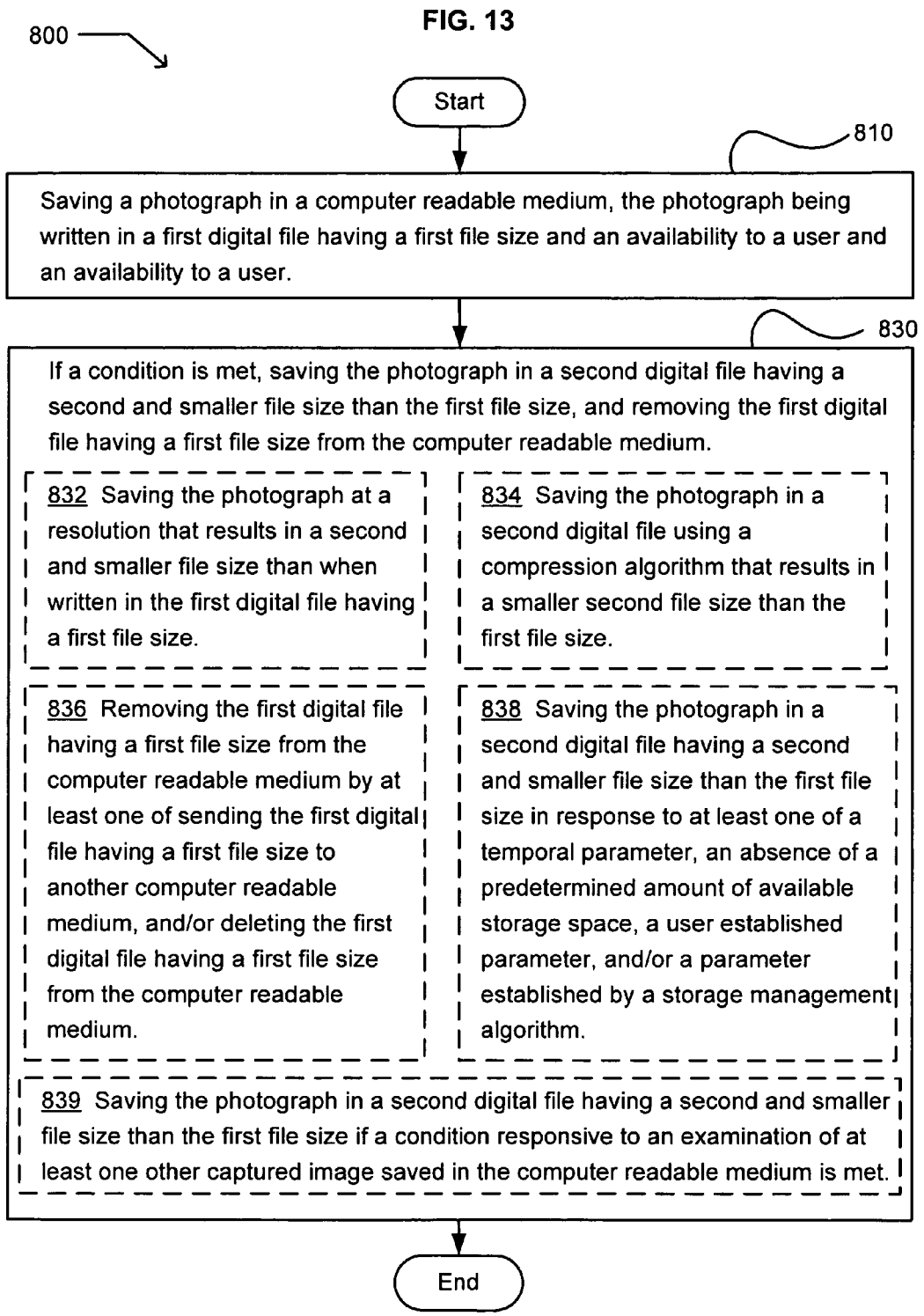
FIG. 13 illustrates an alternative embodiment of the exemplary operational flow of FIG. 11.

FIG. 13 illustrates an alternative embodiment of the exemplary operational flow 800 of FIG. 11. The reduction operation 830 may include at least one additional operation. The at least one additional operation may include an operation 832, an operation 834, and operation 836, an operation 838 and/or an operation 839. The operation 832 saves the photograph at a resolution that results in a second and smaller file size than when written in the first digital file having a first file size. The operation 834 saves the photograph in a second digital file using a compression algorithm that results in a smaller second file size than the first file size. The operation 836 removes the first digital file having a first file size from the computer readable medium by at least one of sending the first digital file having a first file size to another computer readable medium, and/or deleting the first digital file having a first file size from the computer readable medium. For example, the first digital file may be removed from the computer readable medium and sent to another computer readable medium. The another computer readable medium may be permanently or removably associated with an electronic device that is also associated with the computer readable medium, such as a flash memory card or an external hard drive. Alternatively, the another computer readable medium may be permanently or removably associated with another electronic device, such as a computing device or digital camera. The operation 838 saves the photograph in a second digital file having a second and smaller file size than the first file size in response to at least one of a temporal parameter, an absence of a predetermined amount of available storage space, a user established parameter, and/or a parameter established by a storage management algorithm. For example, a temporal parameter may include an elapsed time since the photograph was taken, or last viewed. An absence of a predetermined amount of available storage space may include less than a percentage of the computer readable medium being available for a storage of new data; e.g., less than 10% of a flash memory card being available. Alternatively, the absence of a predetermined amount of available storage space may include less than a preselected storage capacity being available, such as 500 KB, or 1 MB. A storage management algorithm may include an algorithm that characterizes factors that limit the amount of photographs, and alternatively other files, that may be saved on the computer readable medium, and manages the size of at least one of the digital files. The operation 839 saves the photograph in a second digital file having a second and smaller file size than the first file size if a condition responsive to an examination of at least one other captured image saved in the computer readable medium is met.

Figure 14:
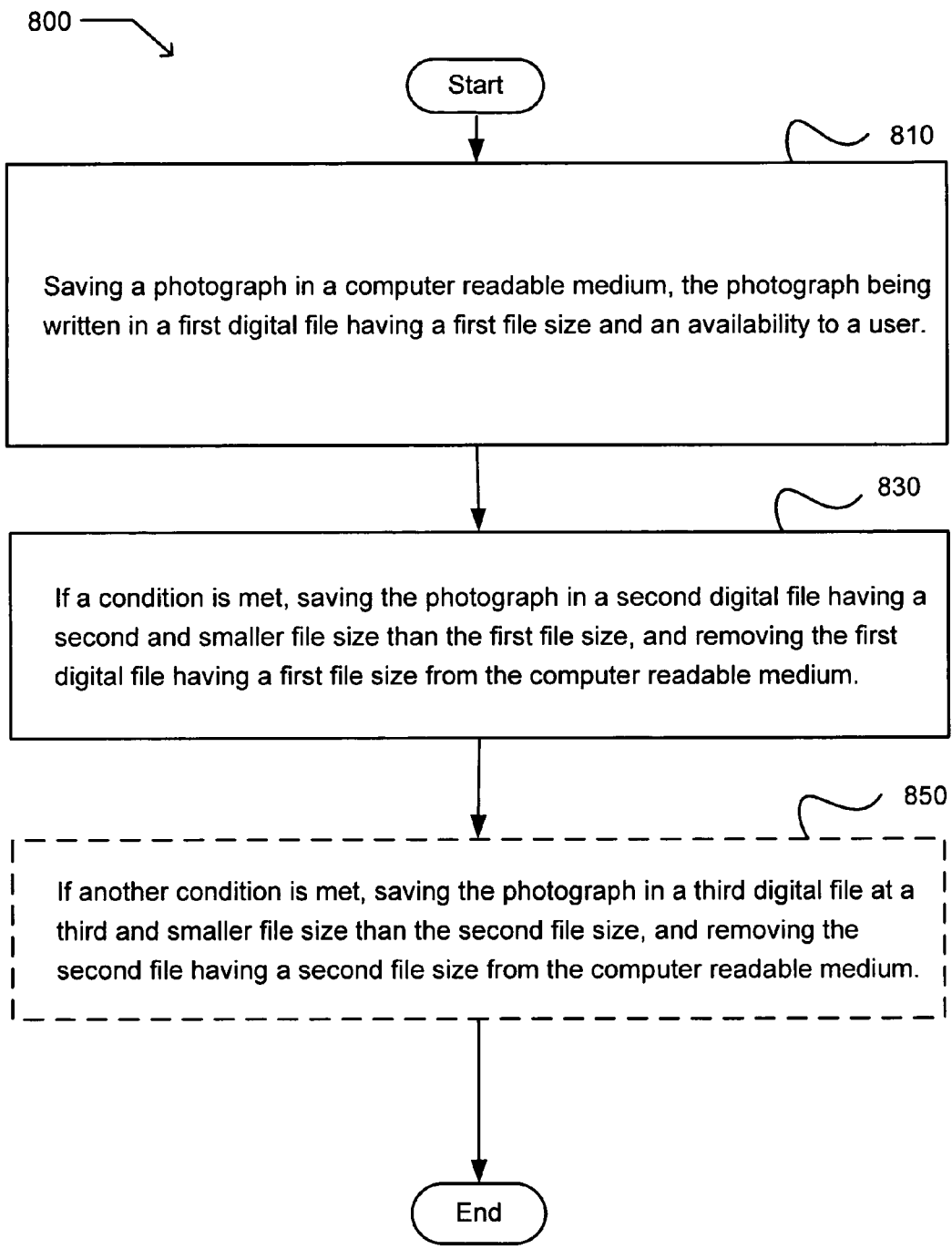
FIG. 14 illustrates another alternative embodiment of the exemplary operational flow of FIG. 11.

FIG. 14 illustrates another alternative embodiment of the exemplary operational flow 800 of FIG. 11. The exemplary operational flow may include at least one additional operation, such as another reduction operation 850. If another condition is met, the another reduction operation saves the photograph in a third digital file at a third and smaller file size than the second file size and removes the second file having a second file size from the computer readable medium.

Figure 15:
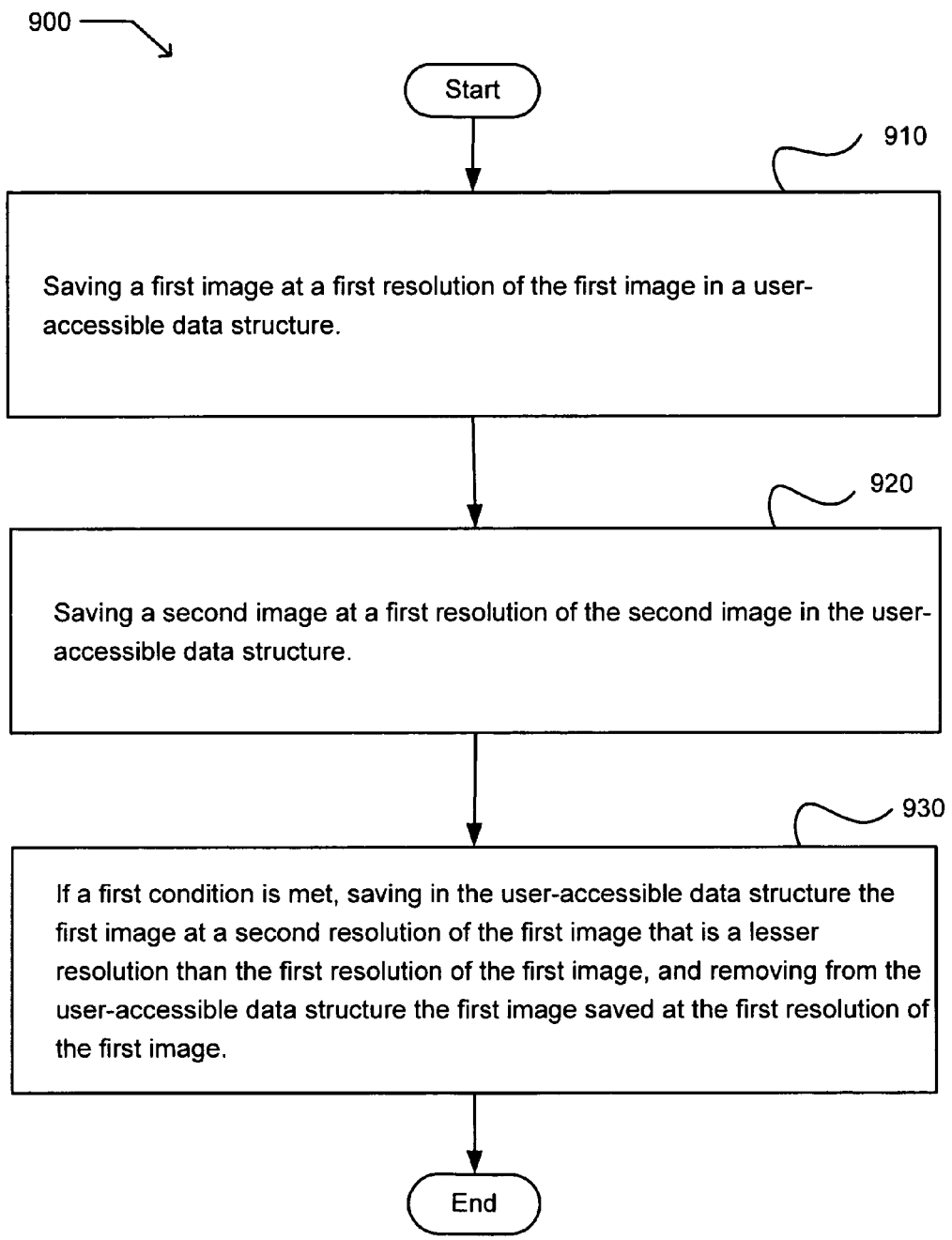
FIG. 15 illustrates an exemplary operational flow.

FIG. 15 illustrates an exemplary operational flow 900. After a start operation, the exemplary operational flow moves to a first storage operation 910. The first storage operation saves a first image at a first resolution of the first image in a user-accessible data structure. A second storage operation 920 saves a second image at a first resolution of the second image in the user-accessible data structure. If a condition is met, a degradation operation 930 saves in the user-accessible data structure the first image at a second resolution of the first image that is a lesser resolution than the first resolution of the first image, and removes from the user-accessible data structure the first image saved at the first resolution of the first image. In an embodiment, the degradation operation 930 may be performed before or after the second storage operation. The operational flow then moves to an end operation.

Figure 16:
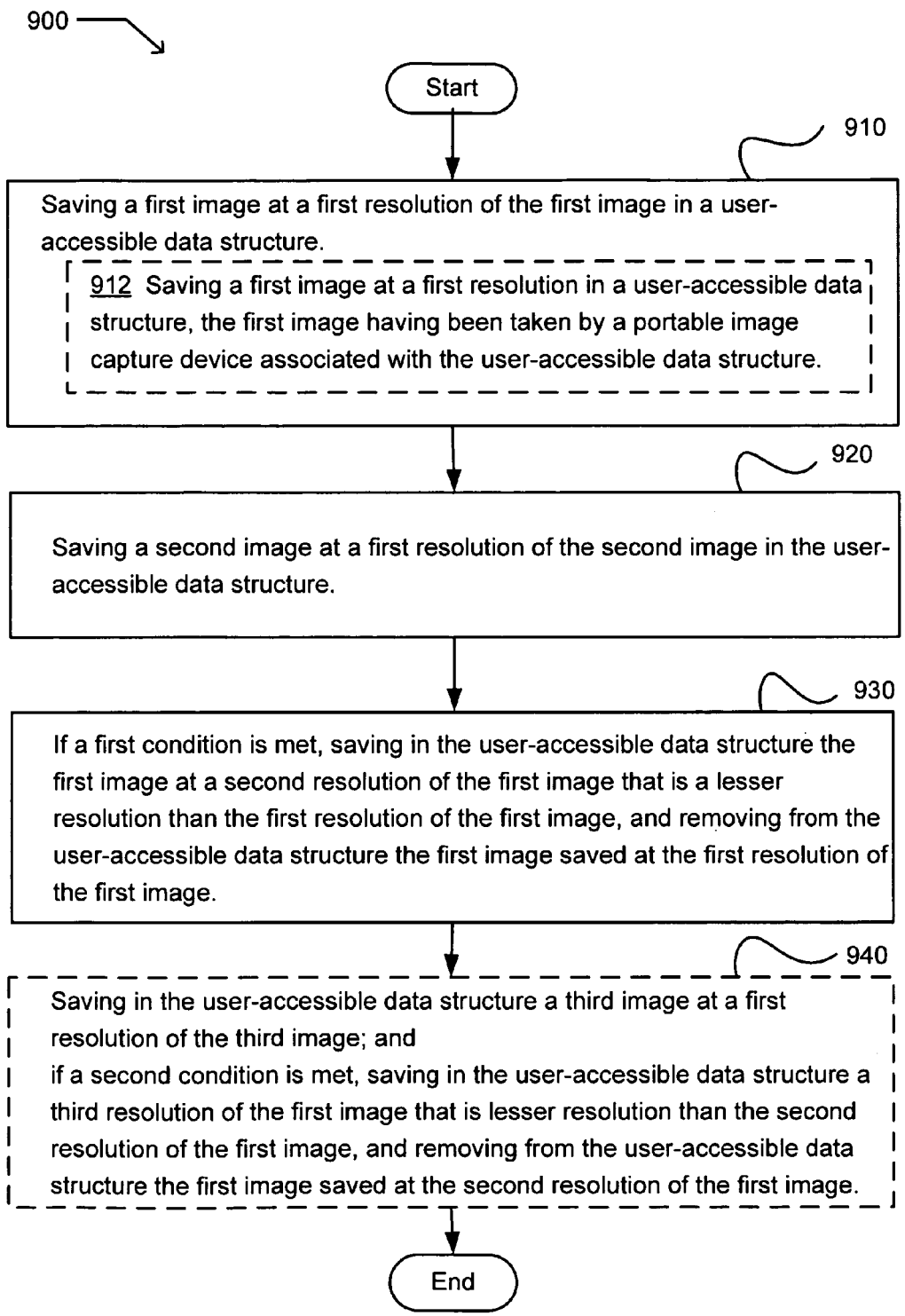
FIG. 16 illustrates another embodiment of the exemplary operational flow of FIG. 15.

FIG. 16 illustrates another embodiment of the exemplary operational flow 900 of FIG. 15. The exemplary operational flow may include at least one additional operation. An additional operation may include a third storage operation 940. The third storage operation 940 includes saving in the user-accessible data structure a third image at a first resolution of the third image. If a second condition is met, the third storage operation also includes saving in the user-accessible data structure a third resolution of the first image that is lesser resolution than the second resolution of the first image, and removing from the user-accessible data structure the first image saved at the second resolution of the first image.

Figure 17:
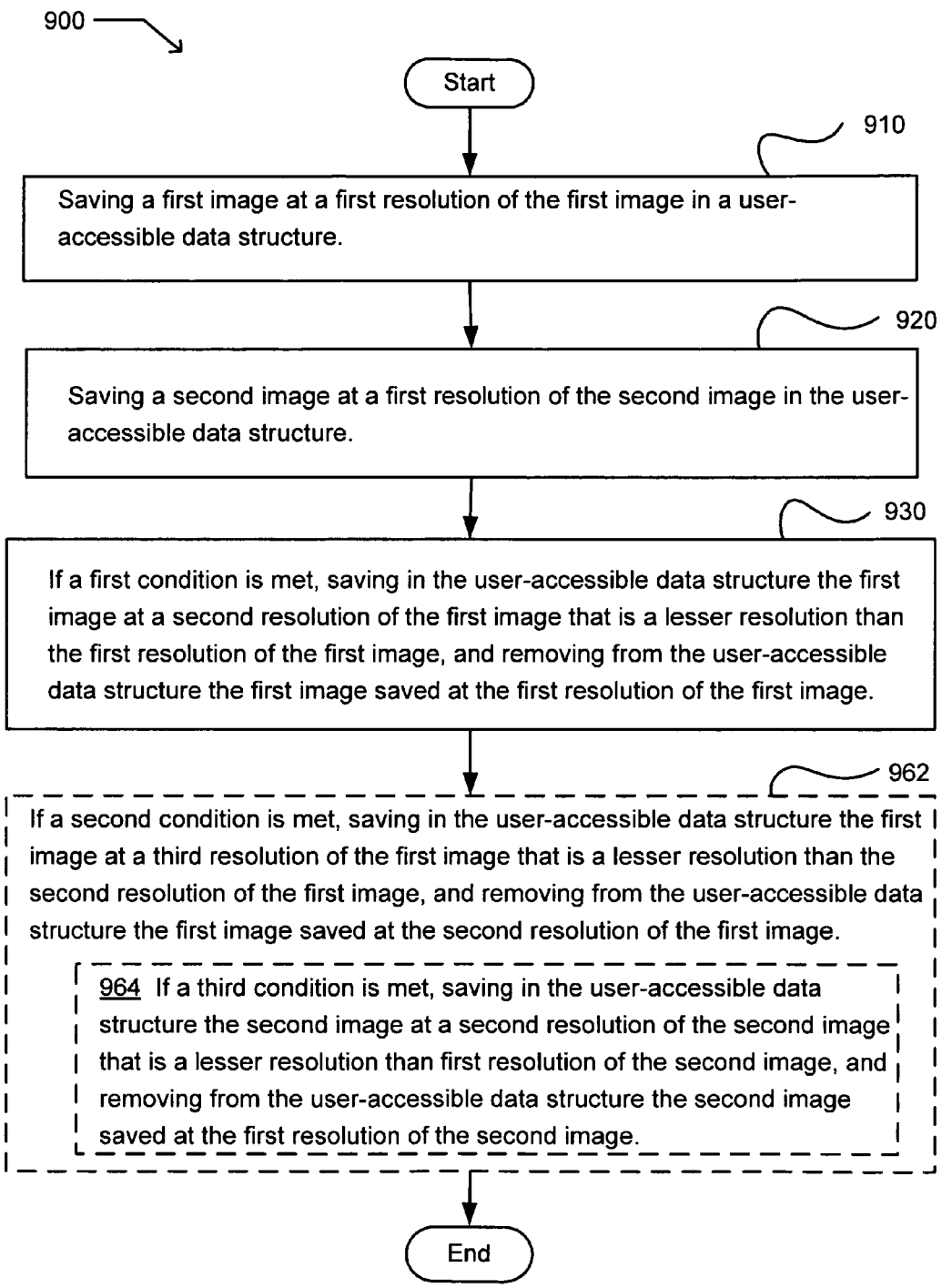
FIG. 17 illustrates a further embodiment of the exemplary operational flow of FIG. 15.

FIG. 17 illustrates a further embodiment of the exemplary operational flow 900 of FIG. 15. The exemplary operational flow may include at least one another additional operation. Another additional operation may include another third storage operation 962. If a second condition is met, the another third storage operation includes saving in the user-accessible data structure a third resolution of the first image that is lesser resolution than the second resolution of the first image, and removing from the user-accessible data structure the first image saved at the second resolution of the first image. The operation 962 may include at least one additional operation, such as the operation 964. If a third condition is met, the operation 964 saves in the user-accessible data structure the second image at a second resolution of the second image that is a lesser resolution than first resolution of the second image, and removes from the user-accessible data structure the second image saved at the first resolution of the second image.

Figure 18:
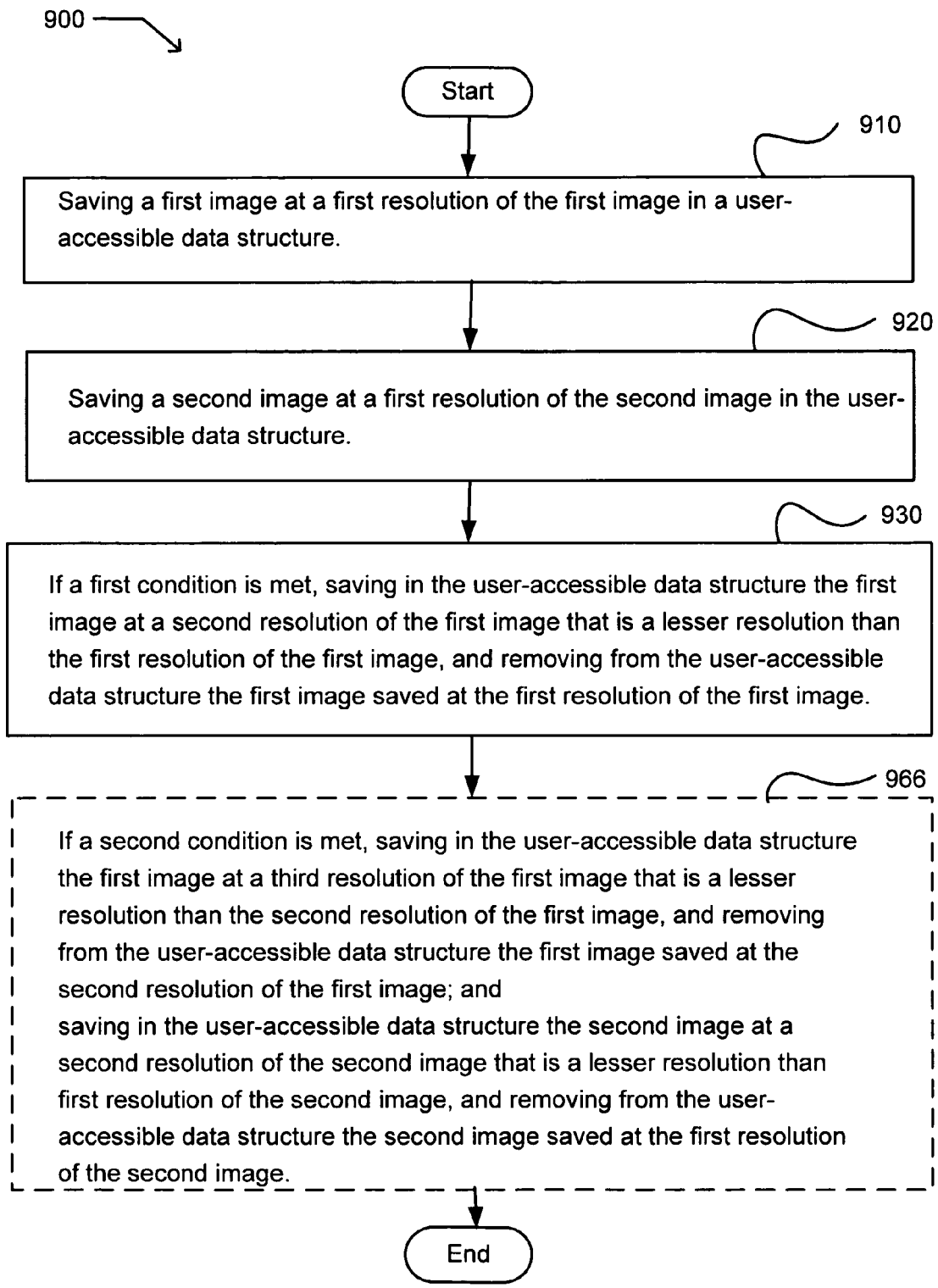
FIG. 18 illustrates a further embodiment of the exemplary operational flow of FIG. 15.

FIG. 18 illustrates a further embodiment of the exemplary operational flow 900 of FIG. 15. The exemplary operational flow may include at least one further additional operation. A further additional operation may include an operation 966. If a second condition is met, the operation 966 saves in the user-accessible data structure the first image at a third resolution of the first image that is a lesser resolution than the second resolution of the first image, and removes from the user-accessible data structure the first image saved at the second resolution of the first image. Also if the second condition is met, the operation 966 saves in the user-accessible data structure the second image at a second resolution of the second image that is a lesser resolution than first resolution of the second image, and removing from the user-accessible data structure the second image saved at the first resolution of the second image.

FIG. 19 illustrates another embodiment of the exemplary operational flow 900 of FIG. 15. The exemplary operational flow may include at least one further additional operation. A further additional operation may include an operation 968, which comprises an operation 986A and an operation 968B. At the operation 968A, the saving in a user-accessible data structure a first image at a first resolution of the first image includes saving in a user-accessible data structure a first image of a real-world scene at a first resolution of the first image. At the operation 968B, saving in the user-accessible data structure a second image at a first resolution of the second image includes saving in the user-accessible data structure a second image of a real-world scene at a first resolution of the second image.

Figure 20A:
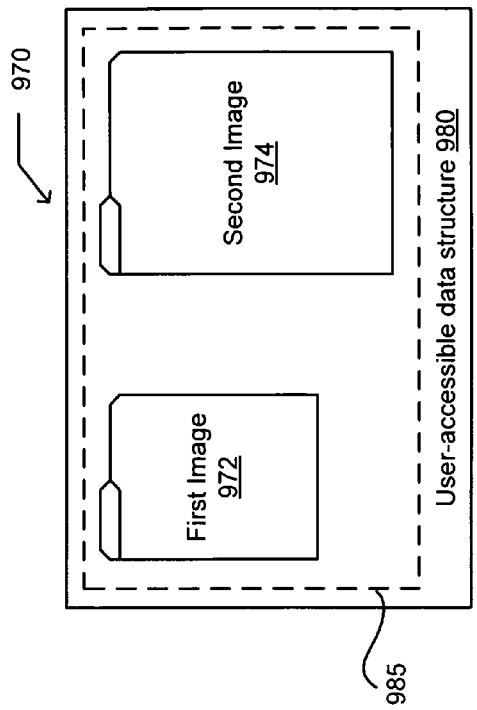
FIGS. 20A-D illustrates an embodiment of the exemplary operational flow of FIG. 16.

FIGS. 20A-D illustrates an embodiment 870 of the exemplary operational flow 800 of FIG. 16. The embodiment 870 of the exemplary operational flow 800 is described using the exemplary system 300 and digital camera 310 of FIG. 3 as an example. In operation of an embodiment of the digital camera 310, a user may compose a first picture/image by orientating the lens 360 toward a subject in a first scene. The user may communicate their preferences about the first composed picture to the digital camera using elements of the user interface 370. Upon shutter activation, an imaging chip of the image acquisition module 320 generates electrical signals corresponding to the first picture/image in a raw format. A processing unit 350 and/or an image management module 330 of the digital camera decodes and/or processes the first image in the raw format into a format, such as a JPEG format, a GIF format, a TIFF format, or a PDF format. The decoding and/or processing typically involves the system memory 355 of FIG. 3. The image management module 330 then saves the first image 972 in a post-decoded/processed format, such as the JPEG format, at a first resolution of the first image in a user-accessible data structure, illustrated as the user-accessible data structure 340 of FIG. 3. FIG. 20A illustrates the first image in the post-decoded/processed format saved in a file at a first resolution of the first image in the user-accessible data structure 980, such as the JPEG format. In an alternative embodiment, the first image may be saved in a raw format in the user-accessible data structure.

For a second image, the user may compose a second picture/image by orientating the lens 360 toward a subject in a second scene as above. The image management module 330 saves the second image 974 at a first resolution of the second image in the computer readable medium 980. FIG. 20A illustrates the second image in a post-decoded/processed format in a saved file at a first resolution of the second image in the user-accessible data structure, such as a JPEG format.

Figure 20B:
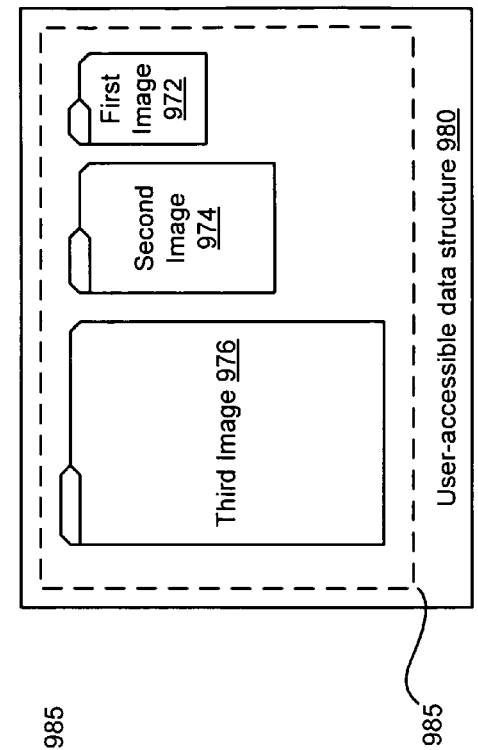

FIG. 20B further illustrates an embodiment that may be implemented at any time, such as before the second image is saved at a first resolution of the second image or thereafter. If a first condition is met, the first image 972 is saved in the user-accessible data structure 980 at a second resolution of the first image that is a lesser resolution than the first resolution of the first image. Also if the first condition is met, the first image saved at the first resolution of the first image is removed from the user-accessible data structure. The first condition may include any condition described in this document. An exemplary first condition may include an absence of a predetermined amount of available storage space in the user-accessible data structure.

Figure 20C:
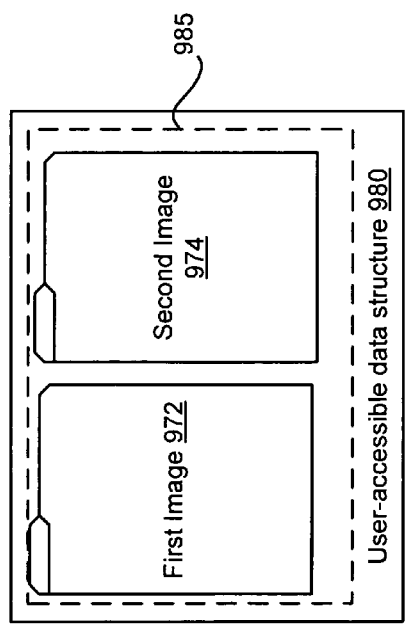

For a third image, the user may compose a third picture/image by orientating the lens 360 toward a subject in a third scene as above. The image management module 330 saves the third image 976 at a first resolution of the third image in the computer readable medium 980. FIG. 20C illustrates the third image in a post-decoded/processed format in a saved file at a first resolution of the third image in the user-accessible data structure, such as a JPEG format.

Figure 20D:
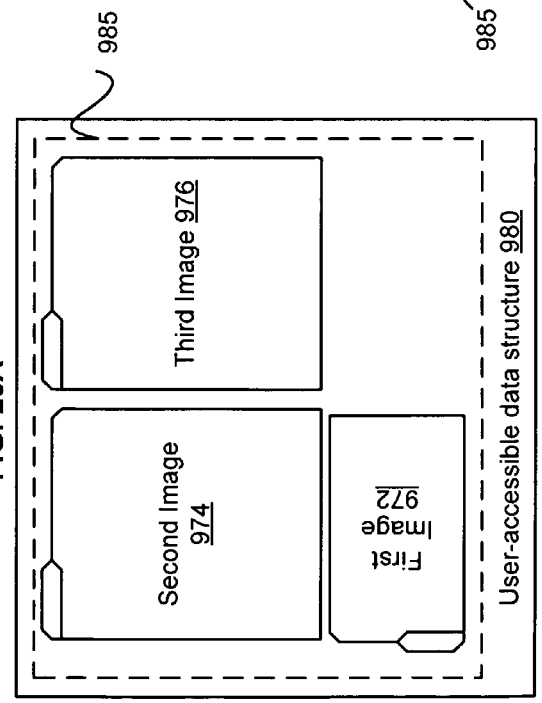

FIG. 20D illustrates an embodiment that may be implemented at any time, such as before the third image 976 is saved at a first resolution of the third image or thereafter. If a second condition is met, the first image 972 is saved in the user-accessible data structure 980 at a third resolution of the first image that is a lesser resolution than the second resolution of the first image. Also if the first condition is met, the first image saved at the second resolution of the first image is removed from the user-accessible data structure. The second condition may include any condition described in this document.

FIG. 20D also illustrates another embodiment that may be implemented at any time, such as before the third image 976 is saved at a first resolution of the third image or thereafter. If a third condition is met, the second image 974 is saved in the user-accessible data structure 980 at a second resolution of the second image that is a lesser resolution than the first resolution of the second image. Also if the second condition is met, the second image saved at the second resolution of the second image is removed from the user-accessible data structure. The second condition may include any condition described in this document.

In an embodiment, the first image 972, the second image 974, and/or the third image 976 may be saved in a digital photo album of images and/or a collection of digital images 985 in the user-accessible data structure. In another embodiment, the first image 972, the second image 974, and/or the third image 976 may be received from a source that may or may not have captured the images. These received images may be saved and managed as described in conjunction with FIGS. 16-19.

Figure 21:
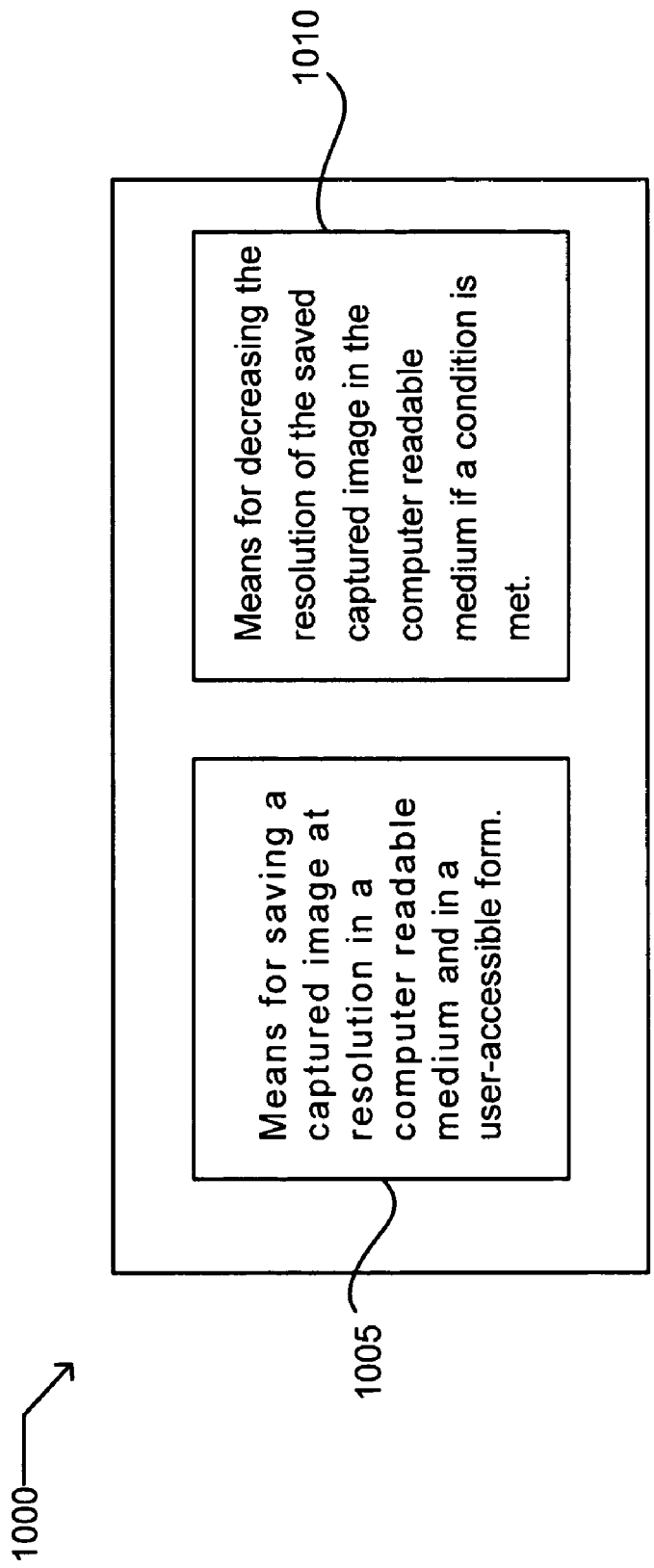
FIG. 21 illustrates an exemplary device in which embodiments may be implemented.

FIG. 21 illustrates an exemplary device 1000 in which embodiments may be implemented. The exemplary device includes means 1005 for saving a captured image at resolution in a computer readable medium and in a user-accessible form. The exemplary device 1010 also includes means 1010 for decreasing the resolution of the saved captured image in the computer readable medium if a condition is met.

Figure 22:
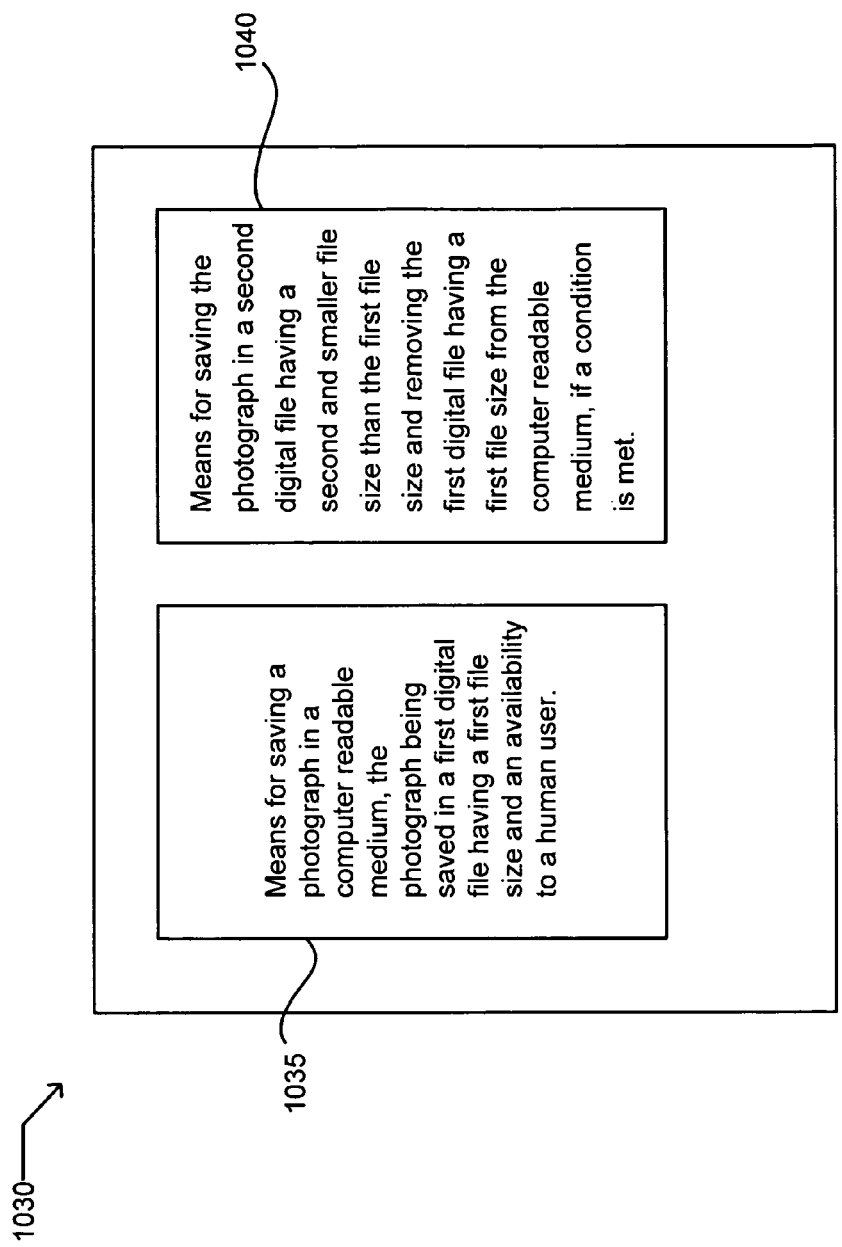
FIG. 22 illustrates another exemplary device in which embodiments may be implemented.

FIG. 22 illustrates another exemplary device 1030 in which embodiments may be implemented. The exemplary device includes means 1035 for saving a photograph in a computer readable medium, the photograph being saved in a first digital file having a first file size and availability to a human user. The exemplary device also includes means 1040 for saving the photograph in a second digital file having a second and smaller file size than the first file size and removing the first digital file having a first file size from the computer readable medium, if a condition is met.

Figure 23:
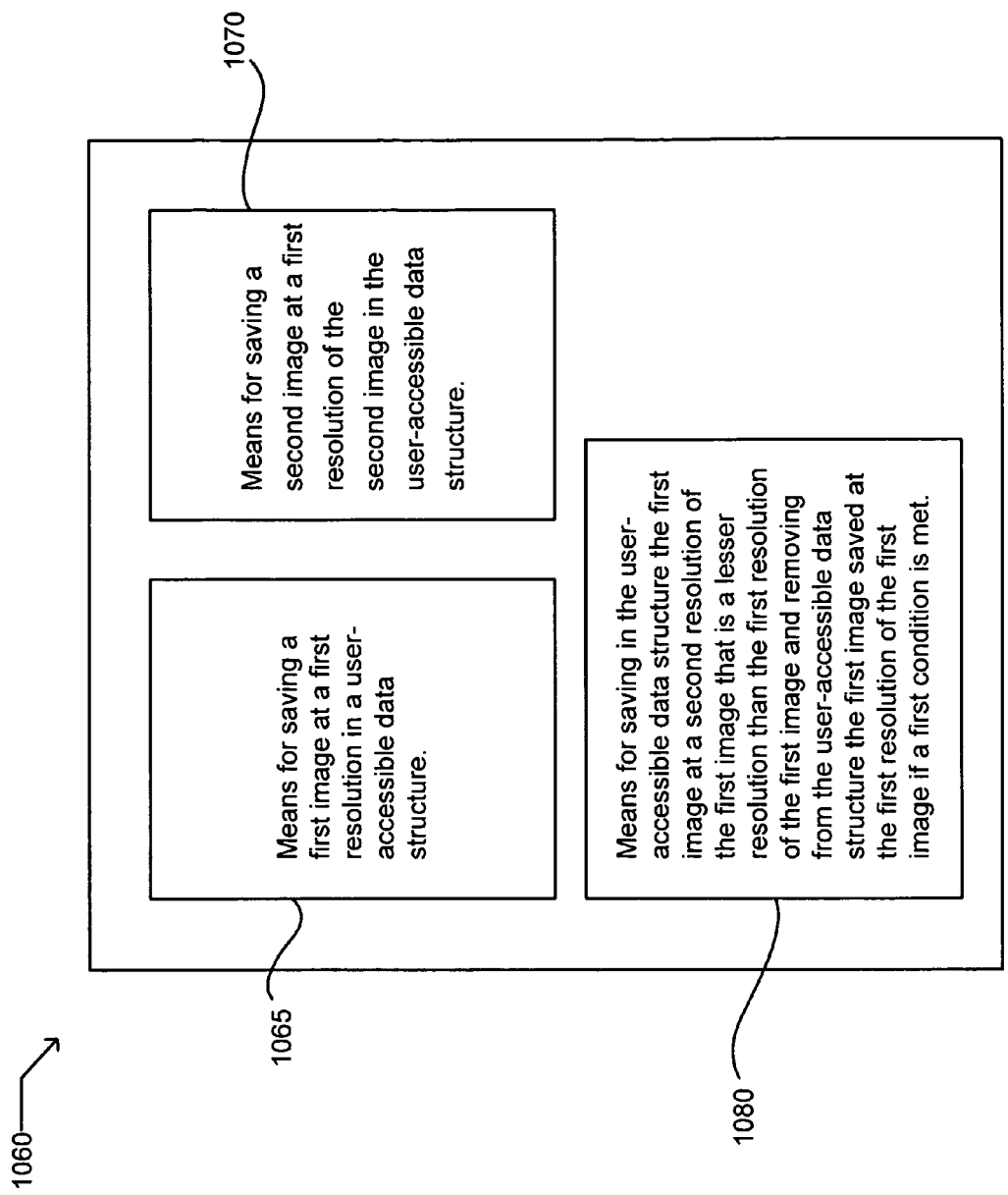
FIG. 23 illustrates a further exemplary device in which embodiments may be implemented.

FIG. 23 illustrates a further exemplary device 1060 in which embodiments may be implemented. The exemplary device includes means 1065 for saving a first image at a first resolution in a user-accessible data structure. The exemplary device also includes means 1070 for saving a second image at a first resolution of the second image in the user-accessible data structure. The exemplary device further includes means 1080 for saving in the user-accessible data structure the first image at a second resolution of the first image that is a lesser resolution than the first resolution of the first image and removing from the user-accessible data structure the first image saved at the first resolution of the first image if a first condition is met.

Figure 24:
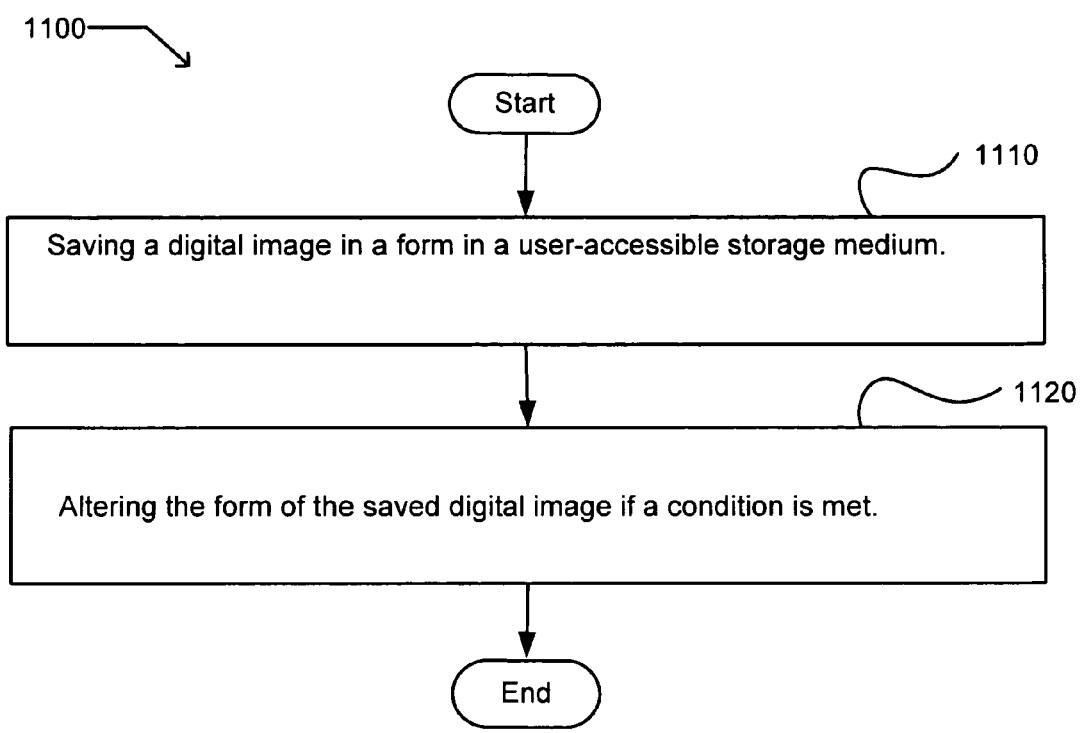
FIG. 24 illustrates an exemplary operational flow in which embodiments may be implemented.

FIG. 24 illustrates an exemplary operational flow 1100 in which embodiments may be implemented. After a start operation, the exemplary operational flow moves to a hold operation 1110. The hold operation saves a digital image in a form in a user-accessible storage medium. A change operation 1120 alters the form of the saved digital image if a condition is met. The operational flow then proceeds to an end operation.

Figure 25:
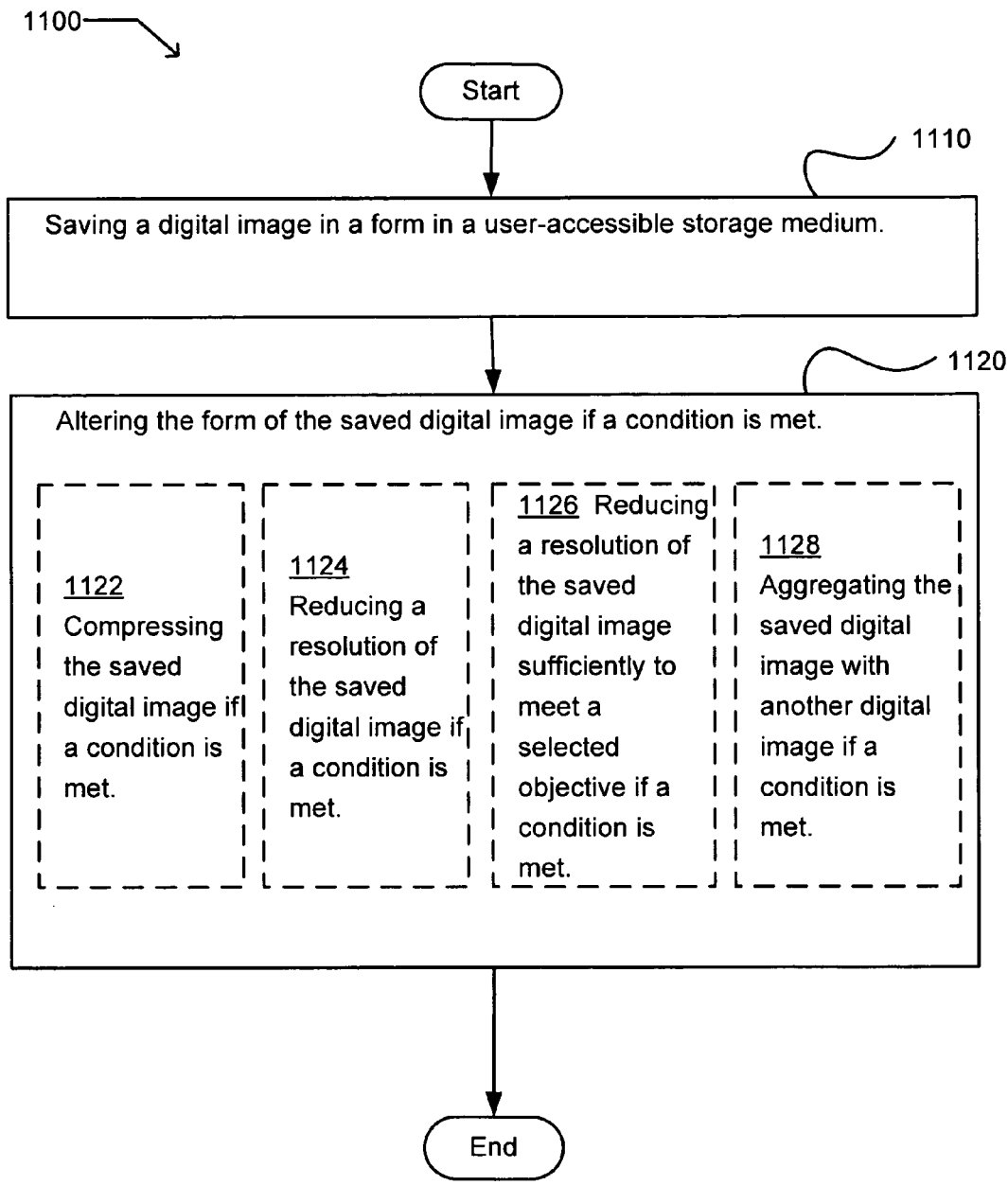
FIG. 25 illustrates an alternative embodiment of the exemplary operational flow of FIG. 24.

FIG. 25 illustrates an alternative embodiment of the exemplary operational flow 1100 of FIG. 24. The change operation 1120 may include at least one additional operation. The at least one additional operation may include an operation 1122, an operation 1124, an operation 1126, and/or an operation 1128. If a condition is met, the operation 1122 compresses the saved digital image. If a condition is met, the operation 1124 reduces a resolution of the saved digital image. If a condition is met, the operation 1126 reduces a resolution of the saved digital image sufficiently to meet a selected objective. For example, the selected objective may include a preselected objective or a substantially contemporaneously selected objective. By way of another example, a selected objective may include constructing a panorama that includes the digital image, creating a high dynamic range composite that includes the digital image, and/or a selected depth of field. If a condition is met, the operation 1128 aggregates the saved digital image with another digital image.

Figure 26:
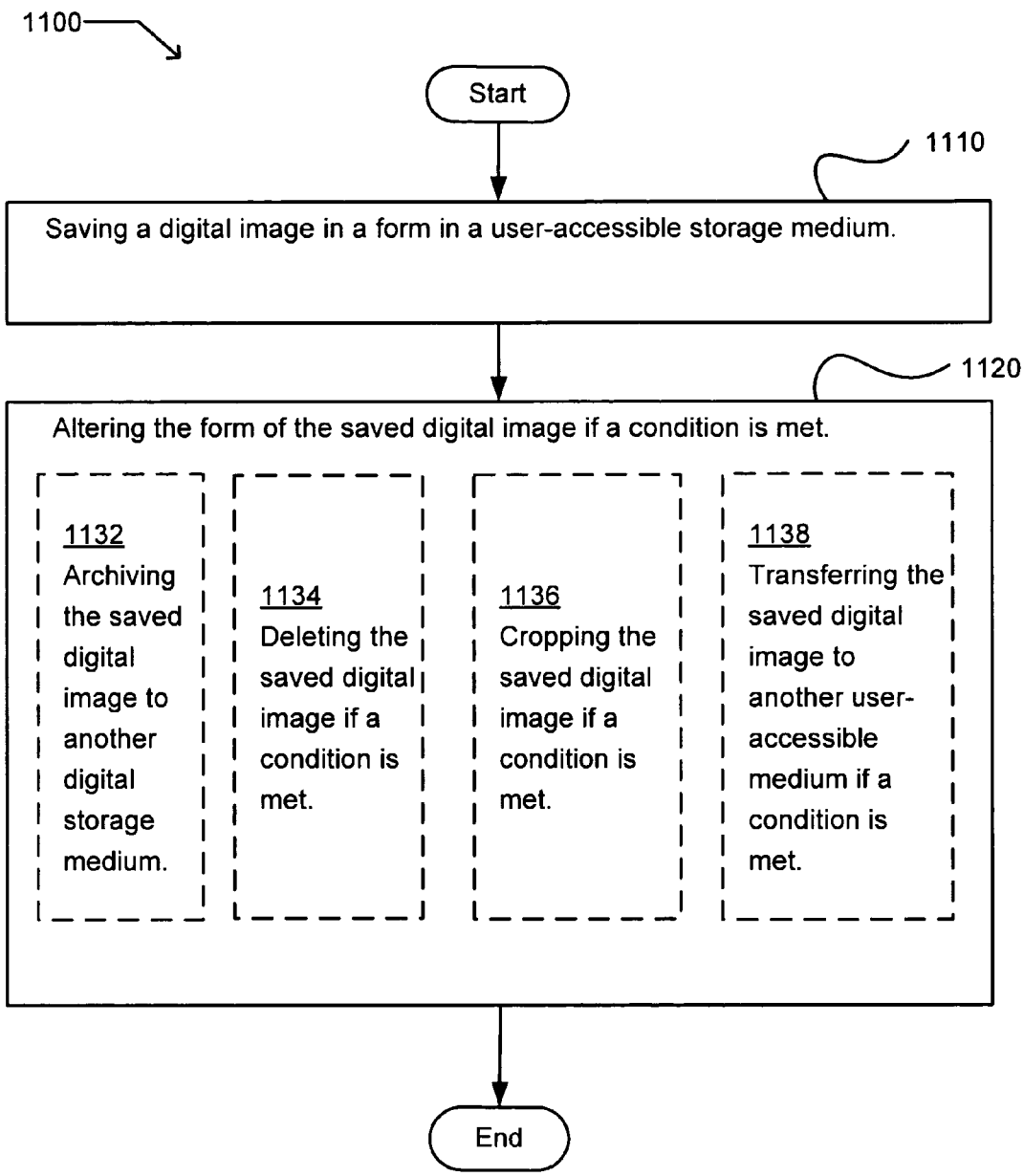
FIG. 26 illustrates another alternative embodiment of the exemplary operational flow of FIG. 24.

FIG. 26 illustrates another alternative embodiment of the exemplary operational flow 1100 of FIG. 24. The change operation 1120 may include at least one additional operation. The at least one additional operation may include an operation 1132, an operation 1134, an operation 1136, and/or an operation 1138. If a condition is met, the operation 1132 archives the saved digital image to another user-accessible storage medium. If a condition is met, the operation 1134 deletes the saved digital image. If a condition is met, the operation 1136 crops the saved digital image. If a condition is met, the operation 1138 transfers the saved digital image to another user-accessible storage medium.

Figure 27:
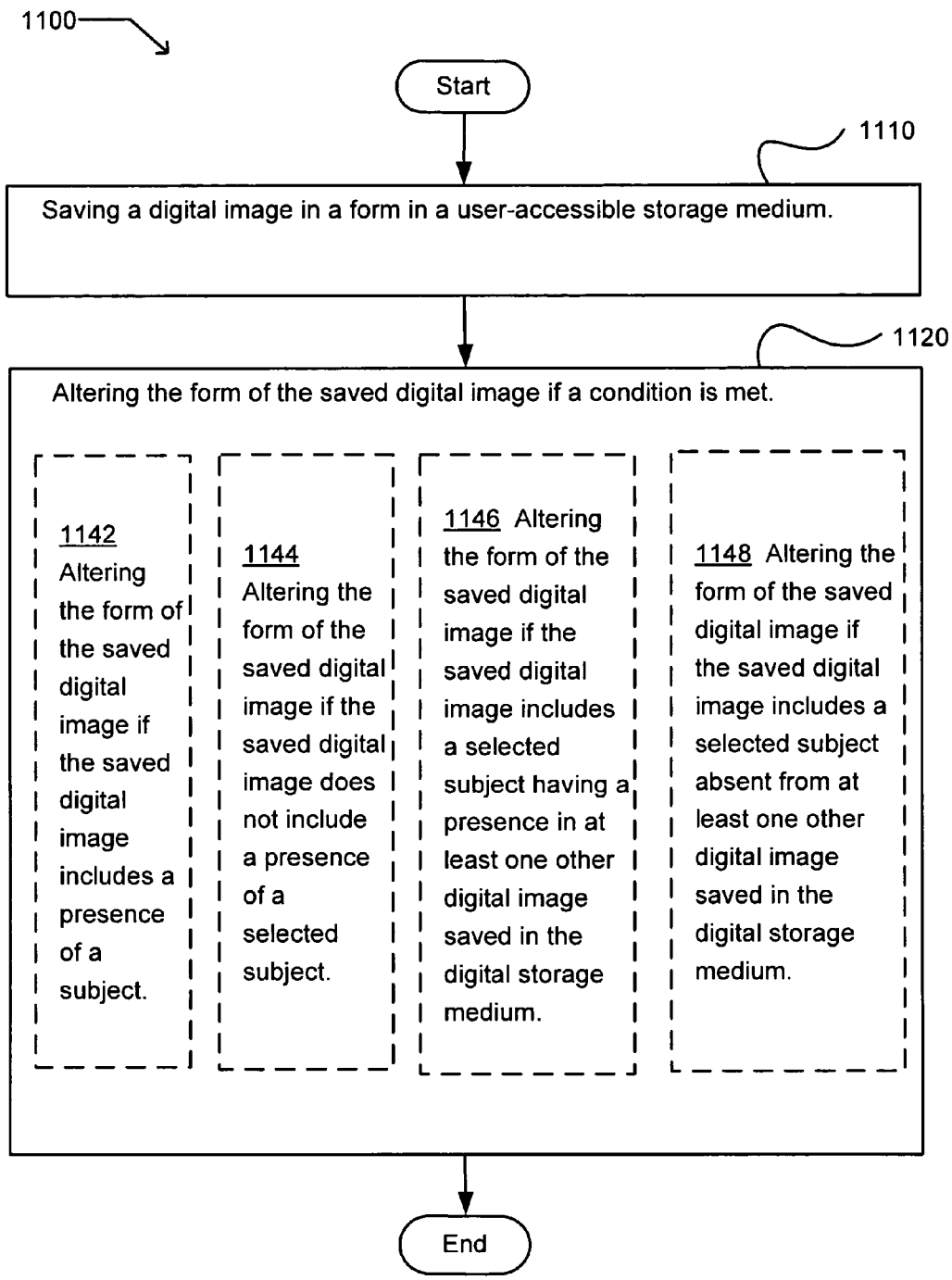
FIG. 27 illustrates a further alternative embodiment of the exemplary operational flow of FIG. 24.

FIG. 27 illustrates a further alternative embodiment of the exemplary operational flow 1100 of FIG. 24. The change operation 1120 may include at least one additional operation. The at least one additional operation may include an operation 1142, an operation 1144, an operation 1146, and/or an operation 1148. If a condition is met, the operation 1142 alters the form of the saved digital image if the saved digital image includes a presence of a selected subject. If a condition is met, the operation 1144 alters the form of the saved digital image if the saved digital image does not include a presence of a selected subject. If a condition is met, the operation 1146 alters the form of the saved digital image if the saved digital image includes a presence of a selected subject having a presence in at least one other digital image saved in the user-accessible storage medium. For example, a presence of a selected subject may include a selected frequency of a presence of a selected subject. If a condition is met, the operation 1148 alters the form of the saved digital image if the saved digital image includes a selected subject absent from at least one other digital image saved in the user-accessible storage medium.

Figure 28:
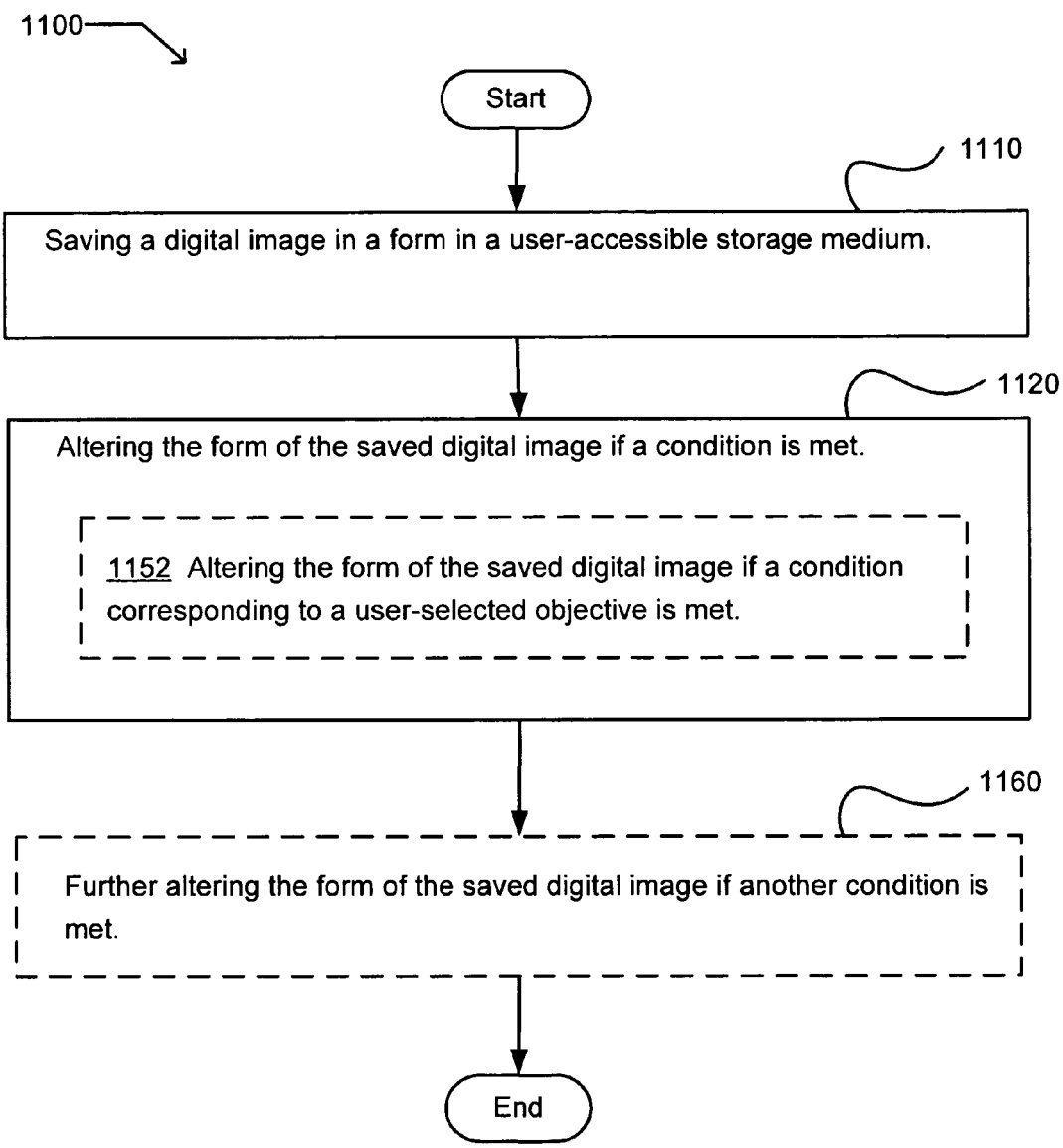
FIG. 28 illustrates an alternative embodiment of the exemplary operational flow of FIG. 24.

FIG. 28 illustrates an alternative embodiment of the exemplary operational flow 1100 of FIG. 24. The change operation 1120 may include at least one additional operation, such as the operation 1152. If a condition is met, the operation 1152 alters the form of the saved digital image if a condition corresponding to a user-selected objective. For example, a user-selected objective may include limiting saved images of my cat in an album or in the computer readable medium to X saved images, and/or saving the digital image to a contact sheet of exemplars and/or thumbnail display if more than Y pictures of subject Z are saved in the computer readable medium. The operational flow 1100 may include at least one additional operation, such as the operation 1160. If a condition is met, the operation 1160 further alters the form of the saved digital image.

Figure 29:
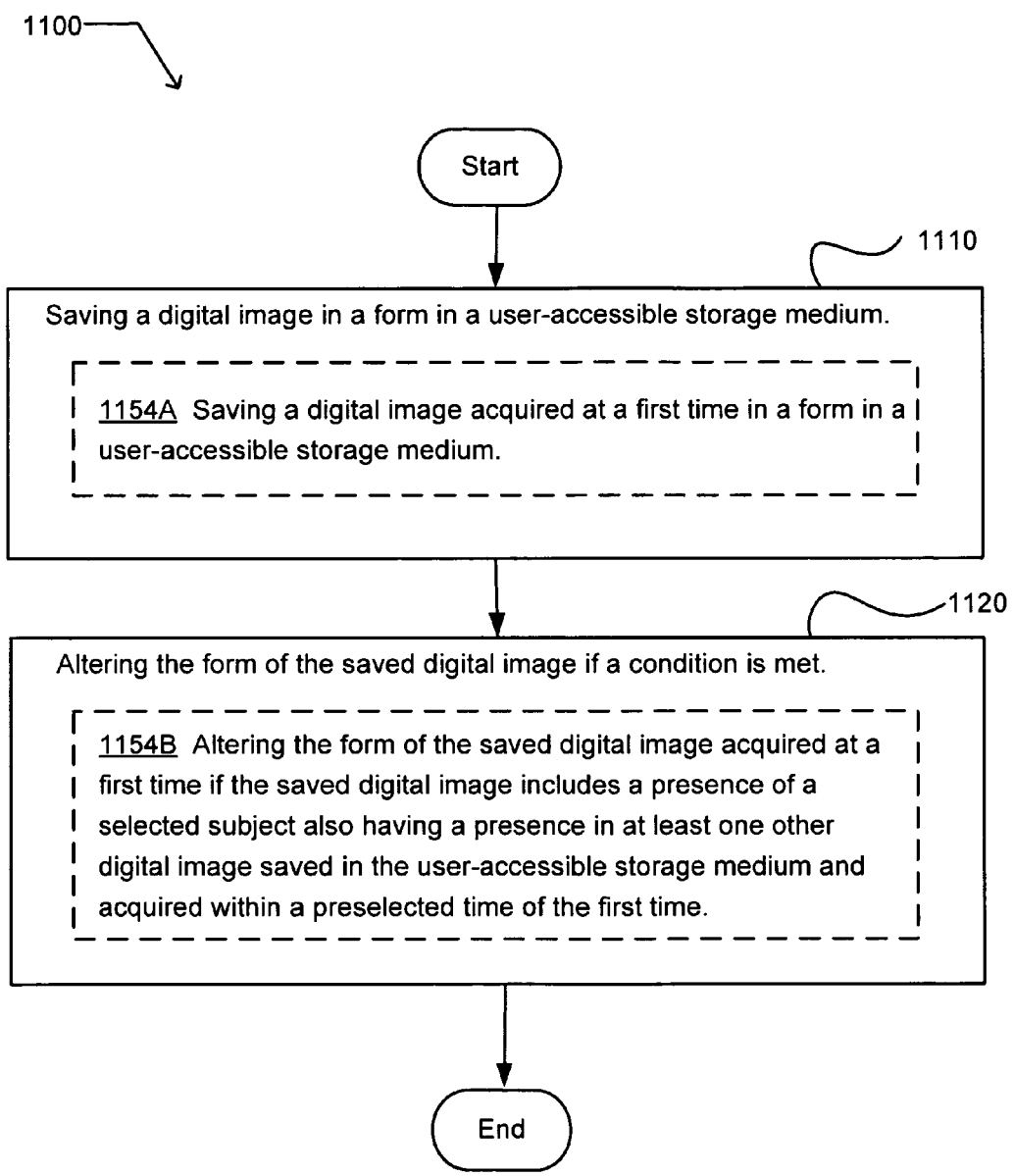
FIG. 29 illustrates an alternative embodiment of the exemplary operational flow of FIG. 24.

FIG. 29 illustrates an alternative embodiment of the exemplary operational flow 1100 of FIG. 24. An additional operation may include an operation 1154, which comprises an operation 1154A and an operation 1154B. At the operation 1154A, the saving a digital image in a form in a user-accessible storage medium includes saving a digital image acquired at a first time in a form in a user-accessible storage medium. The digital image acquired at a first time may include a digital image captured at a first time or a digital image saved at a first time. At the operation 1154B, the altering the form of the saved digital image if a condition is met includes altering the form of the saved digital image acquired at a first time if the saved digital image includes a presence of a selected subject also having a presence in at least one other digital image saved in the user-accessible storage medium and acquired within a preselected time of the first time.

FIG. 30 illustrates an exemplary system 1200 in which embodiments may be implemented. The exemplary system includes a device 1210. The device includes a processing unit, such as the processing unit 350 of FIG. 3, a system memory, such as the system memory 355 of FIG. 3, a storage medium manager module 1230, and a user-accessible digital storage medium, illustrated as the user-accessible digital storage media 1240. In an alternative embodiment, the device may include an image acquisition module, such as the image acquisition module 320 of FIG. 3; a lens, such as the lens 360 of FIG. 3; and/or a user interface, such as the user interface 370 of FIG. 3.

The storage medium manager module 1230 is operable to save a digital image in a form in the user-accessible digital storage medium 1240. The storage medium manager module is also operable to alter the form of the saved digital image if a condition is met. The condition may include at least one of clarifying condition, a user-defined condition, an informed condition, an evaluated condition, and/or a computed condition. An informed condition may include a condition that employs obtained information, in contrast to a condition running autonomously or an uninformed condition. An evaluated condition may include a condition evaluated in response to an internal condition, an external condition, and/or both conditions. A computed condition may include any computed condition, in contrast with a standing condition and/or a normal or native condition related to the digital image and/or the storage medium.

In an embodiment, the storage medium manager module 1230 operable to save a digital image in a form in the user-accessible digital storage medium 1240 includes a storage medium manager module operable to save a digital image of a real-world event in a form in the user-accessible digital storage medium. In another embodiment, the user-accessible digital storage medium includes a user-accessible digital storage medium associated with a digital camera operable to capture the digital image. In a further embodiment, the device 1210 further includes the processing unit 350. In another embodiment, the storage medium manager module further includes a storage medium manager module operable to provide the altered form of the saved digital image.

An embodiment provides a computer program product. The computer program product includes a computer-readable signal-bearing medium bearing program instructions. The program instructions include instructions operable to perform a process in a computing device. The process includes saving a digital image in a form in a user-accessible storage medium, and altering the form of the saved digital image if a condition is met. The computer-readable signal-bearing medium bearing the program instructions may include a computer-storage medium bearing the program instructions. The computer-readable signal-bearing medium bearing the program instructions may include a communications medium bearing the program instructions.

Another embodiment provides a device. The device includes means for saving a digital image in a form in the digital storage medium. The device also includes means for altering the form of the saved digital image if a condition is met.

A further embodiment provides a method. The method includes saving a captured image in a user-accessible memory. The method also includes deallocating at least a portion of the user-accessible memory associated with the saved captured image if a condition is met. In an embodiment, the saving a captured image into a user-accessible memory includes saving a captured image at a resolution into a user-accessible memory. In another embodiment, the deallocating at least a portion of the user-accessible memory associated with the saved captured image if a condition is met includes deallocating at least a portion of the user-accessible memory associated with the saved captured image if a condition is met. In a further embodiment, the deallocating at least a portion of the user-accessible memory associated with the saved captured image if a condition is met includes deallocating at least a portion of the user-accessible memory associated with the saved captured image if a condition is met that includes at least one of a clarifying condition, a user-defined condition, an informed condition, an evaluated condition, and/or a computed condition.

An embodiment provides a device. The device includes a memory and a memory manager. The memory manager includes operability to save a captured image into a user-accessible memory. The memory manager also includes operability to deallocate at least a portion of the memory associated with the resolution if a condition is met.

Another embodiment provides a device. The device includes first means for a holding user-accessible digital data representative of an image. The device also includes second means for saving user-accessible digital data representative of an image in the first means. The device further includes third means for altering the saved user-accessible digital data representative of the saved digital image if a condition is met.

A further embodiment provides a computer program product. The computer program product includes a computer-readable signal-bearing medium bearing program instructions. The program instructions are operable to perform a process in a computing device. The process includes saving a captured image in a memory and in a user-accessible form. The process also includes deallocating at least a portion of the memory associated with the saved captured image if a condition is met. The computer-readable signal-bearing medium bearing the program instructions may include a computer-storage medium bearing the program instructions. The computer-readable signal-bearing medium bearing the program instructions may include a communications medium bearing the program instructions.

An embodiment provides a method. The method includes directing digital data representative of an image to a managed means for holding the digital data representative of an image. The method also includes accepting modified digital data representative of the image, the digital data representative of the image having been modified by deallocating at least a portion of the digital data representative of the image by the managed means for holding digital data upon occurrence of a condition.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost versus efficiency tradeoffs. Those having skill in the art will appreciate that there are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims.

We claim:

1. A digital camera, comprising:
   an image acquisition module for capturing an image;
   a nontransitory computer readable medium; and
   an image management unit associated with a processor for:
   (i) saving a captured image at a first resolution in a user-accessible data structure in the computer readable medium and in a user-accessible form;
   (ii) decreasing the resolution of the saved captured image at the first resolution in the user-accessible data structure by saving the captured image at a second resolution less than the first resolution if a condition is met, the condition comprising capturing a second image that is determined to be duplicative or repetitive of the saved captured image; and
   (iii) removing the captured image at the first resolution from the user-accessible data structure if the condition is met.

2. The digital camera of claim 1, wherein the image acquisition module for capturing an image includes:
   an image acquisition module for capturing a still image, an image stream, and/or a combination of a still image and an image stream.

3. The digital camera of claim 1, wherein the image acquisition module for capturing an image includes:
   an image acquisition module for capturing at least one of a visual image, an audio image, and/or a combination of a visual image and an audio image.

4. The digital camera of claim 1, wherein the image acquisition module for capturing an image includes:
   an image acquisition module for capturing an image in response to a received instruction from another digital camera.

5. The digital camera of claim 1, wherein the nontransitory computer readable medium includes a non-volatile computer storage device.

6. The digital camera of claim 1, wherein the nontransitory computer readable medium includes a non-volatile nontransitory computer readable medium.

7. The digital camera of claim 1, wherein the nontransitory computer readable medium includes a removable non-volatile nontransitory computer readable medium.

8. The digital camera of claim 1, wherein the image management unit associated with a processor for saving a captured image at a first resolution in a user-accessible data structure in the nontransitory computer readable medium and in a user-accessible form includes:
   an image management unit associated with a processor for saving a captured image at a resolution in the nontransitory computer readable medium and in a user-accessible album of images stored in a nontransitory computer readable medium.

9. The digital camera of claim 1, wherein the image management unit associated with a processor for saving a captured image at a first resolution in a user-accessible data structure in the nontransitory computer readable medium and in a user-accessible form includes:
   an image management unit associated with a processor for saving a captured image at a resolution in the nontransitory computer readable medium and in a user-accessible collection of images stored in a nontransitory computer readable medium.

10. The digital camera of claim 1, wherein the image management unit associated with a processor for decreasing the resolution of the saved captured image at the first resolution in the user-accessible data structure by saving the captured image at a second resolution less than the first resolution if a condition is met includes:
    an image management unit associated with a processor for decreasing the resolution of the saved captured image in the nontransitory computer readable medium using a lossy compression algorithm if a condition is met.

11. The digital camera of claim 1, wherein the image management unit associated with a processor for decreasing the resolution of the saved captured image at the first resolution in the user-accessible data structure by saving the captured image at a second resolution less than the first resolution if a condition is met includes:
    an image management unit associated with a processor for decreasing the resolution of the saved captured image in the nontransitory computer readable medium if a time for displaying the saved captured image does not exceed a preselected time threshold.

12. The digital camera of claim 11, wherein the preselected time threshold exceeds five seconds.

13. The digital camera of claim 11, wherein the preselected time threshold exceeds at least a selected one of ten seconds, thirty seconds, one minute, thirty minutes, ninety minutes, five hours, twelve hours, one day, one week, one month, or one year.

14. The digital camera of claim 1, wherein the image management unit associated with a processor for decreasing the resolution of the saved captured image at the first resolution in the user-accessible data structure by saving the captured image at a second resolution less than the first resolution if a condition is met includes:
    an image management unit associated with a processor for decreasing the resolution of the saved captured image in the nontransitory computer readable medium if a time value is framed by a preselected time window.

15. The digital camera of claim 1, wherein the image management unit associated with a processor for decreasing the resolution of the saved captured image at the first resolution in the user-accessible data structure by saving the captured image at a second resolution less than the first resolution if a condition is met includes:
    an image management unit associated with a processor for decreasing the resolution of the saved captured image in the nontransitory computer readable medium if a condition is met where the condition corresponds to at least one of a storage space availability in the nontransitory computer readable medium, a user established parameter, a preselected content of the image, and/or a parameter established by a storage management algorithm.

16. The digital camera of claim 1, wherein the image management unit associated with a processor for decreasing the resolution of the saved captured image at the first resolution in the user-accessible data structure by saving the captured image at a second resolution less than the first resolution if a condition is met includes:
    an image management unit associated with a processor for decreasing the resolution of the saved captured image in the nontransitory computer readable medium if a condition independent of the operation to save a captured image at a resolution in the nontransitory computer readable medium is met.

17. The digital camera of claim 1, wherein the image management unit associated with a processor for decreasing the resolution of the saved captured image at the first resolution in the user-accessible data structure by saving the captured image at a second resolution less than the first resolution if a condition is met includes:
    an image management unit associated with a processor for decreasing the resolution of the saved captured image in the nontransitory computer readable medium if a condition responsive to an examination of at least one other captured image saved in the nontransitory computer readable medium is met.

18. The digital camera of claim 1, wherein the image management unit further includes an image management unit for:

(iv) further decreasing the resolution of the captured image saved in the nontransitory computer readable medium if another condition is met.

19. The digital camera of claim 1, wherein the digital camera further comprises a processing unit.

20. The digital camera of claim 1, wherein the image management unit is further for:
decreasing the resolution of the saved captured image at the second resolution if the saved captured image at the second resolution is not displayed for a predetermined amount of time after the resolution has been decreased.

21. The digital camera of claim 1, wherein the image management unit is further for:
examining a content or context of one or more saved captured images for repetitiveness or duplication upon capturing an additional image.

22. The digital camera of claim 1, wherein the image management unit associated with a processor for decreasinq the resolution of the saved captured image at the first resolution in the user-accessible data structure by saving the captured image at a second resolution less than the first resolution if a condition is met includes:
aggregating the saved captured image with a second saved captured image.

* * * * *